July 28, 1970   R. D. KAUFFMAN ET AL   3,521,765
CLOSED-END MACHINE FOR PROCESSING ARTICLES
IN A CONTROLLED ATMOSPHERE
Filed Oct. 31, 1967   16 Sheets-Sheet 1

INVENTORS
R.D. KAUFFMAN
R.K. MILLER
F.J. VIOLA

BY R. P. Miller
ATTORNEY

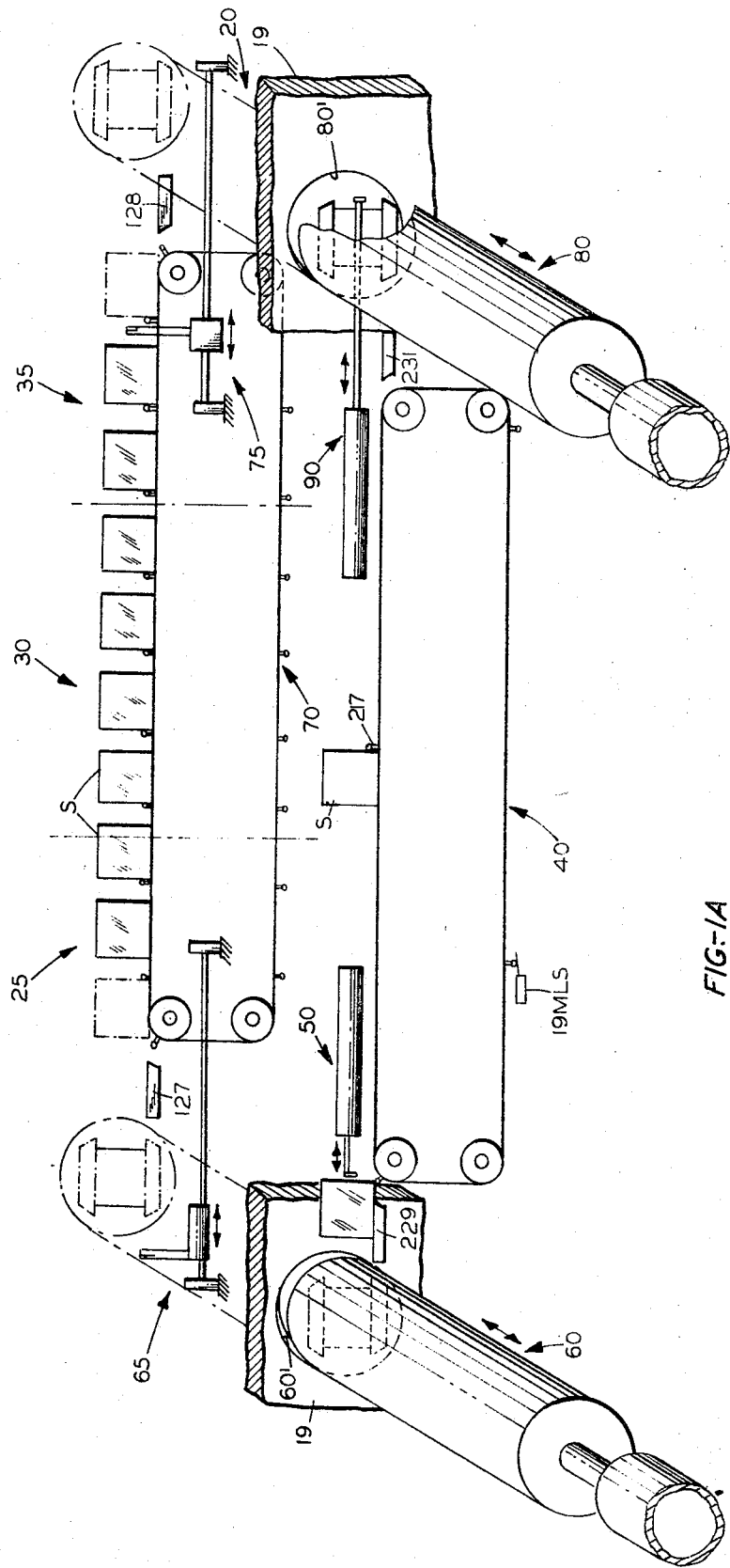

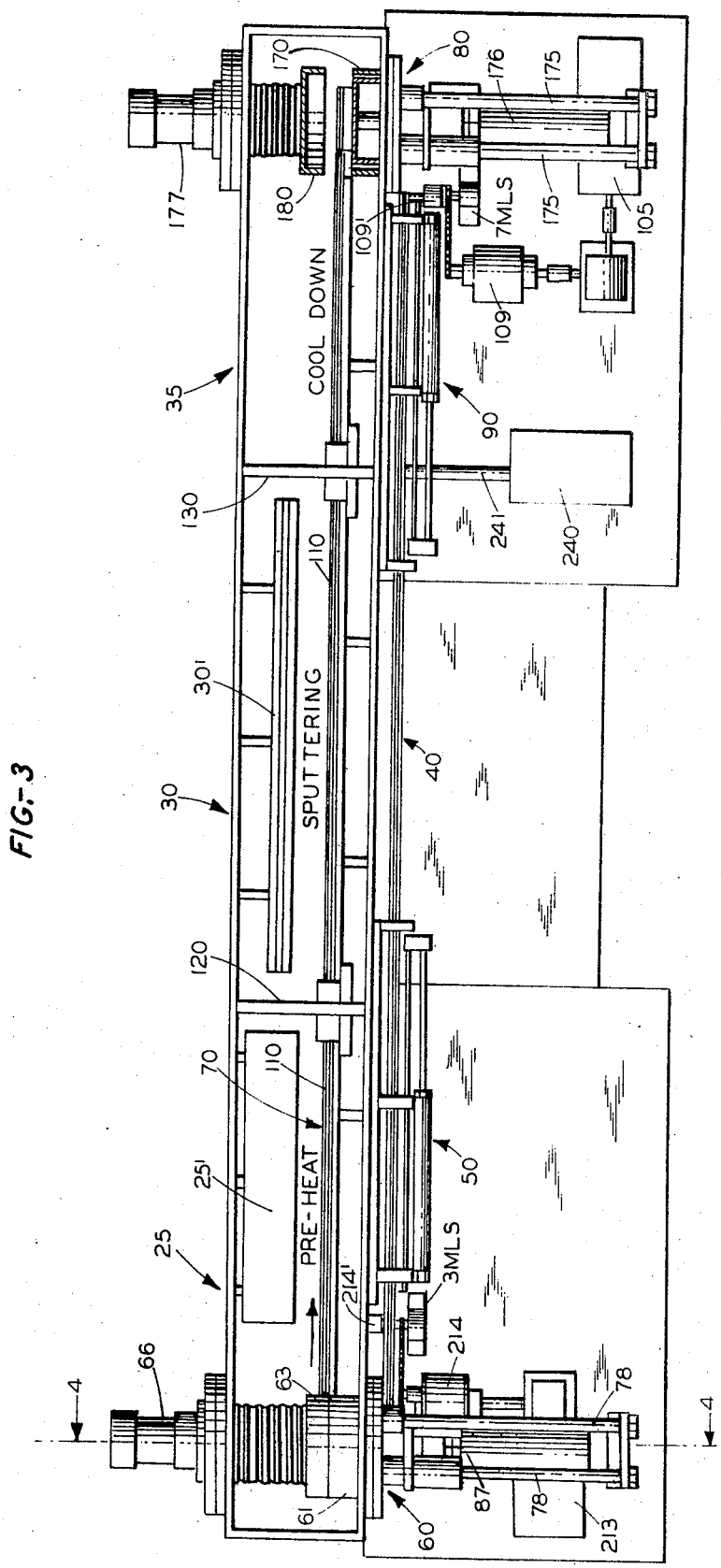

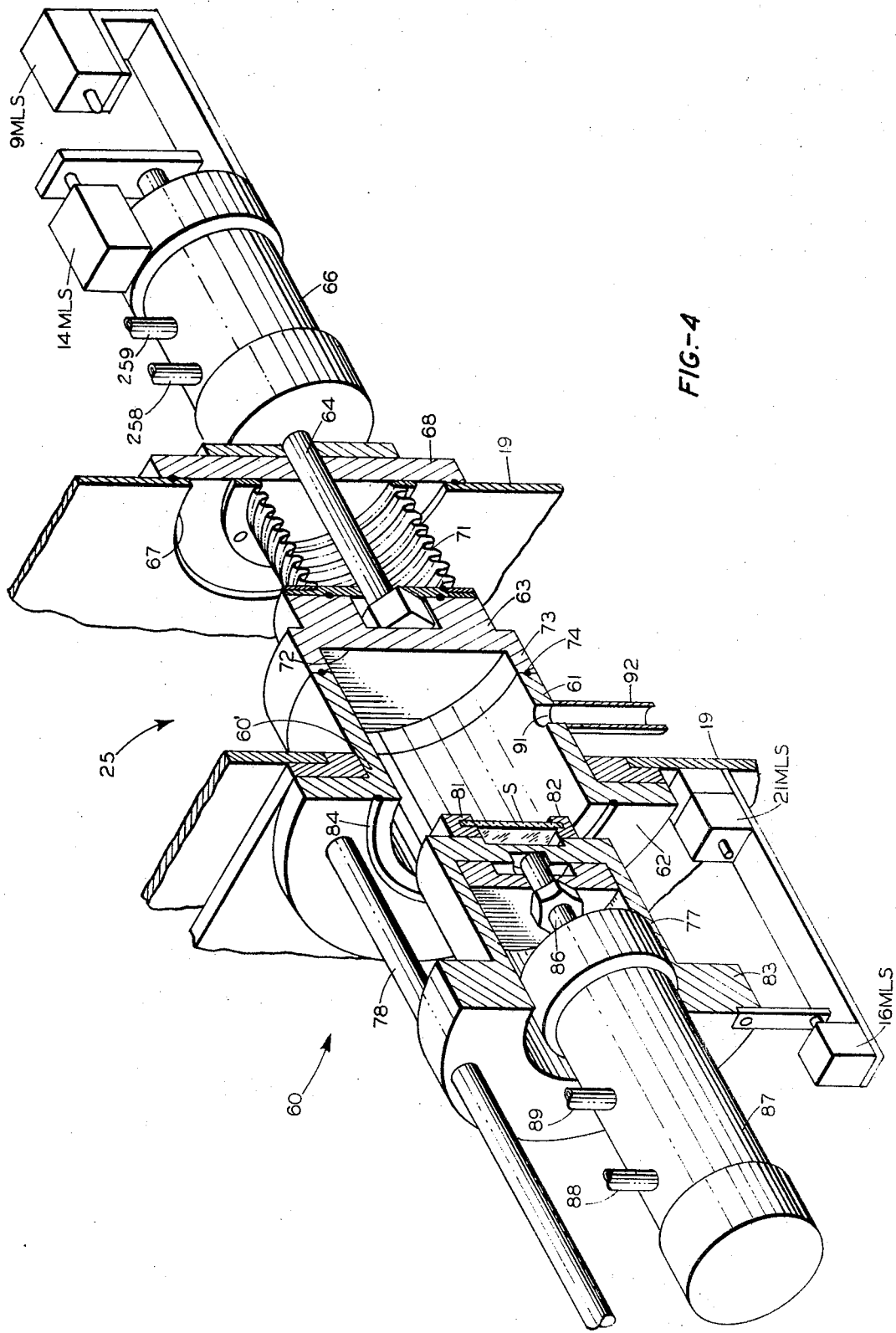

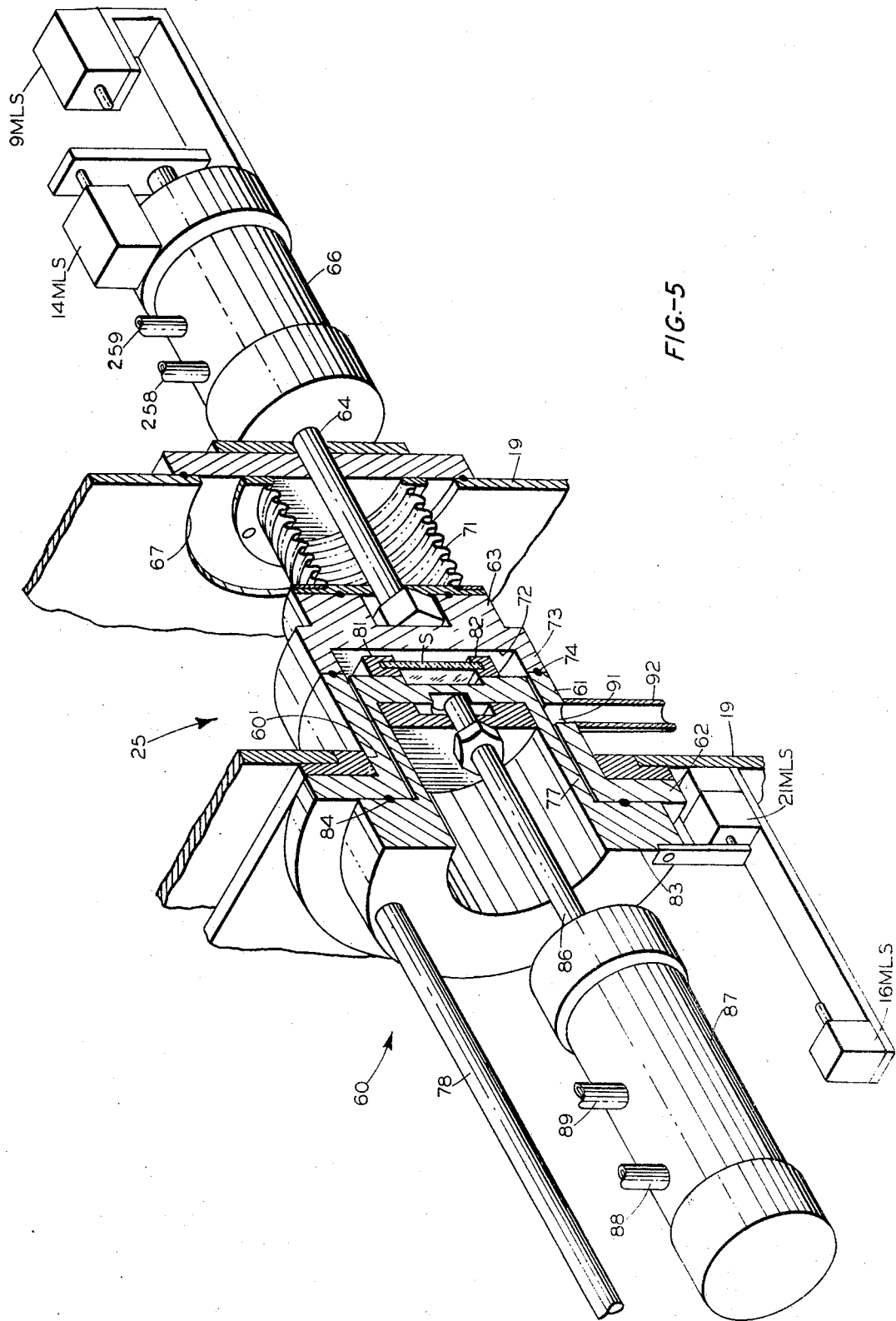

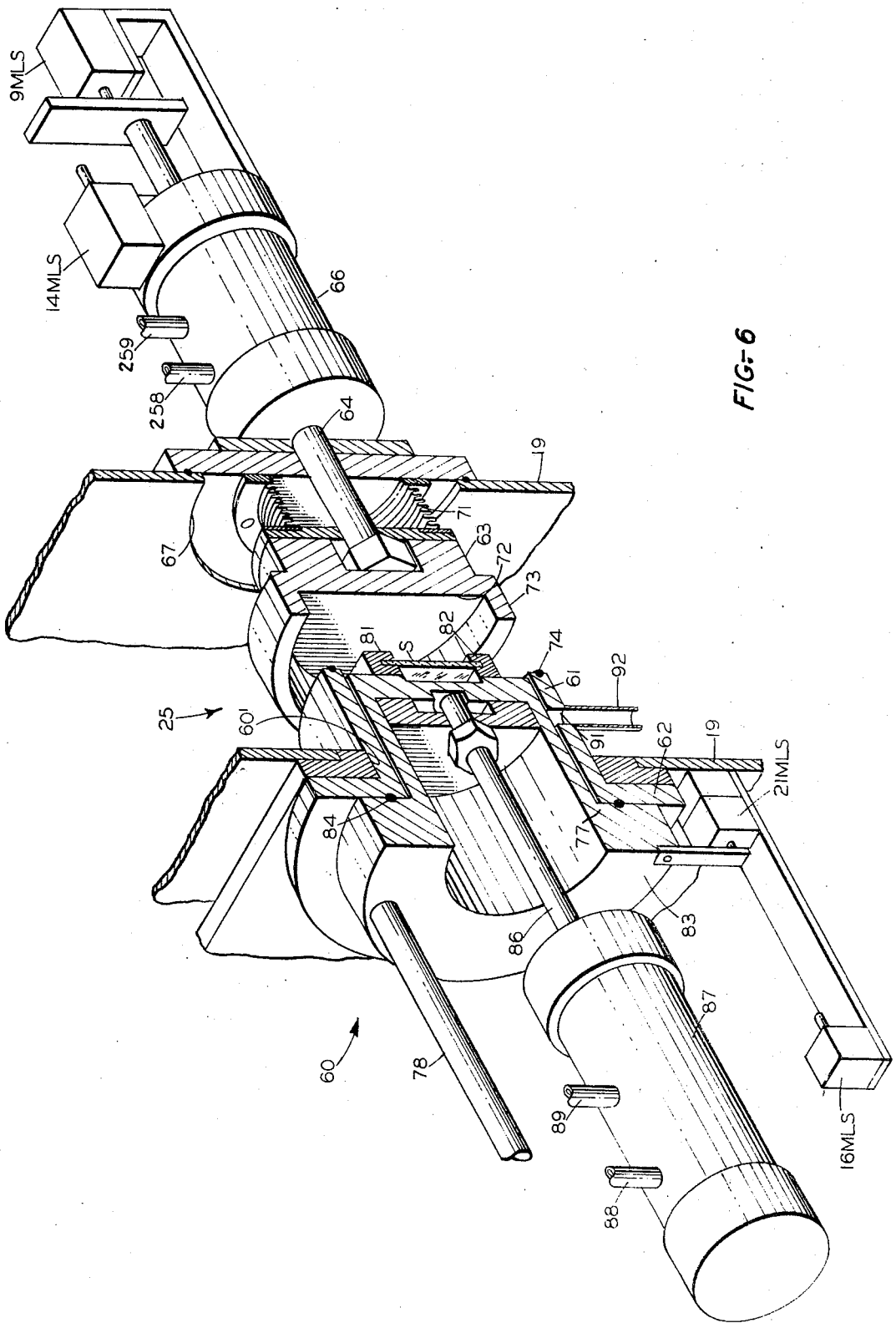

FIG.-9
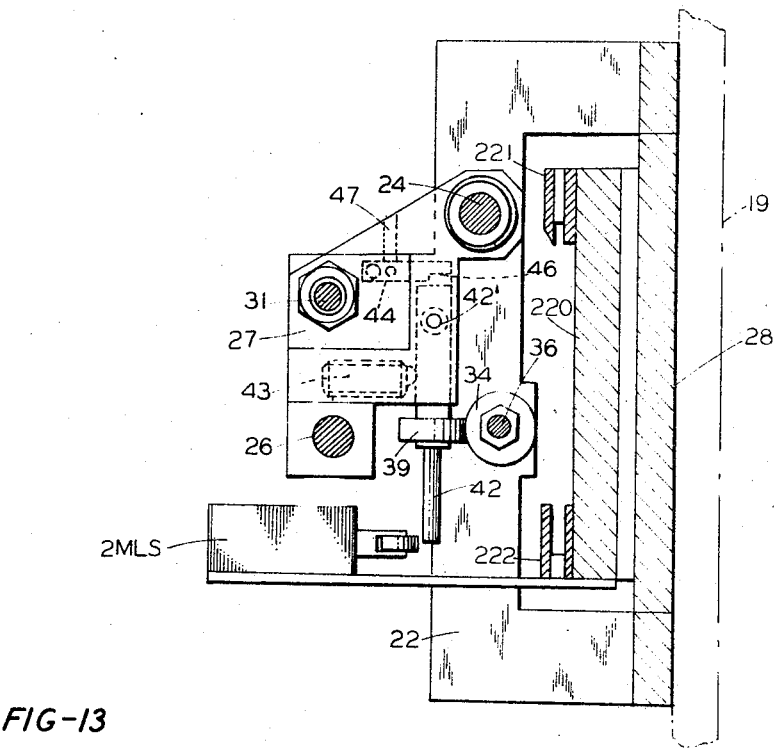
FIG.-13
FIG.-14
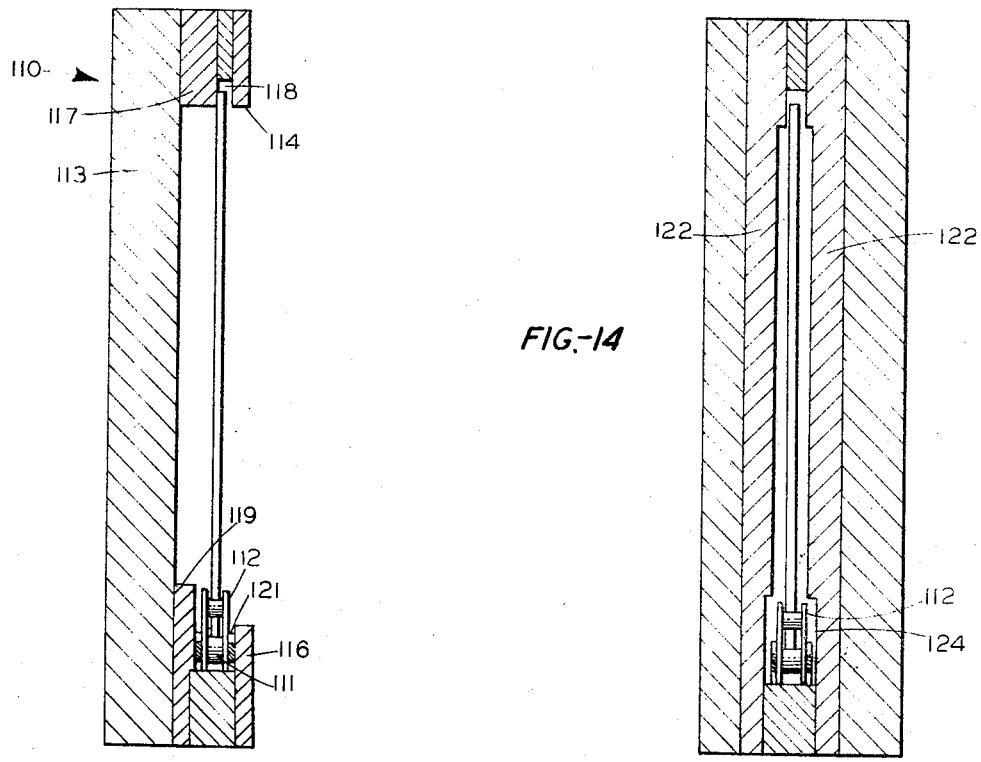

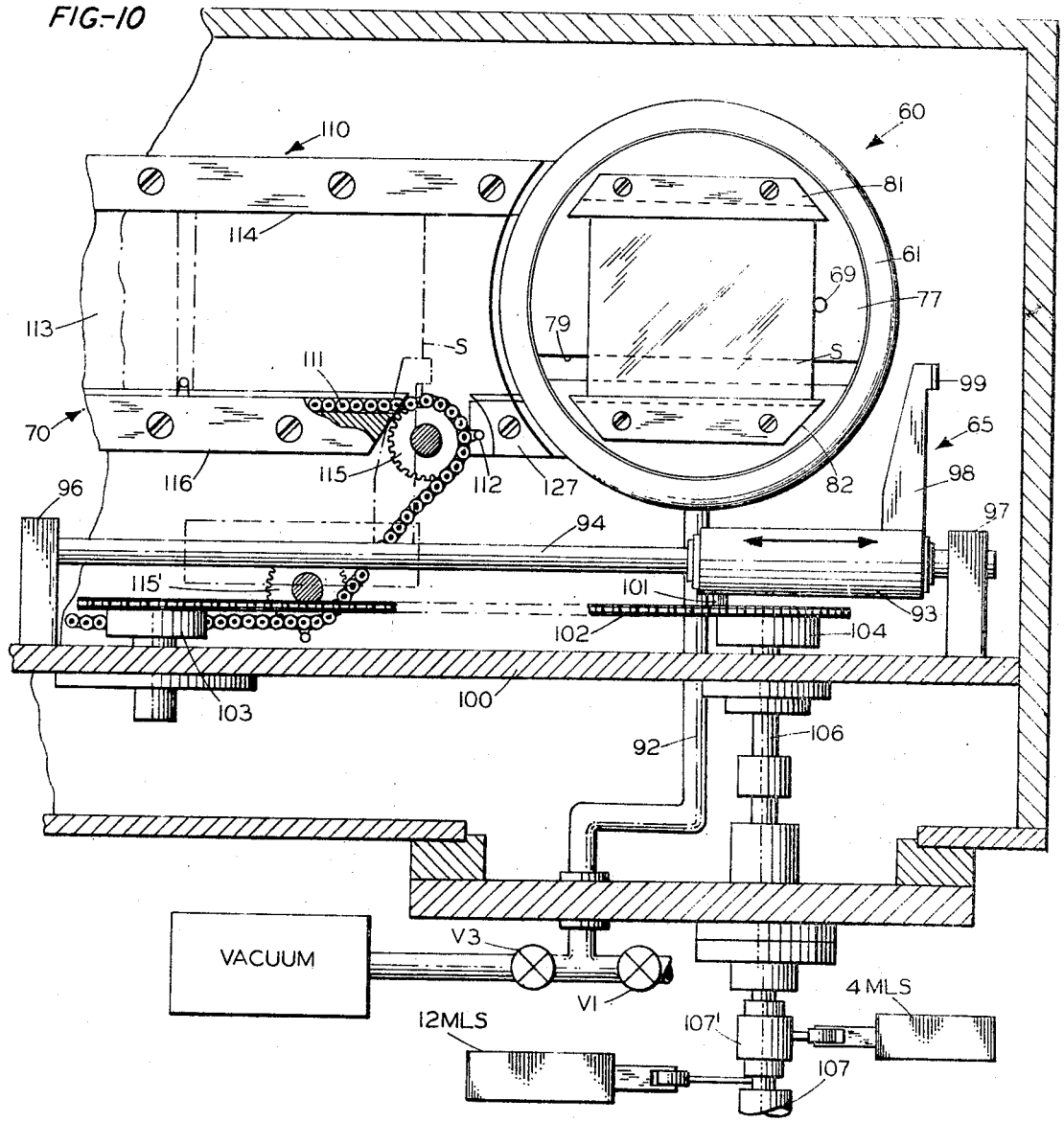

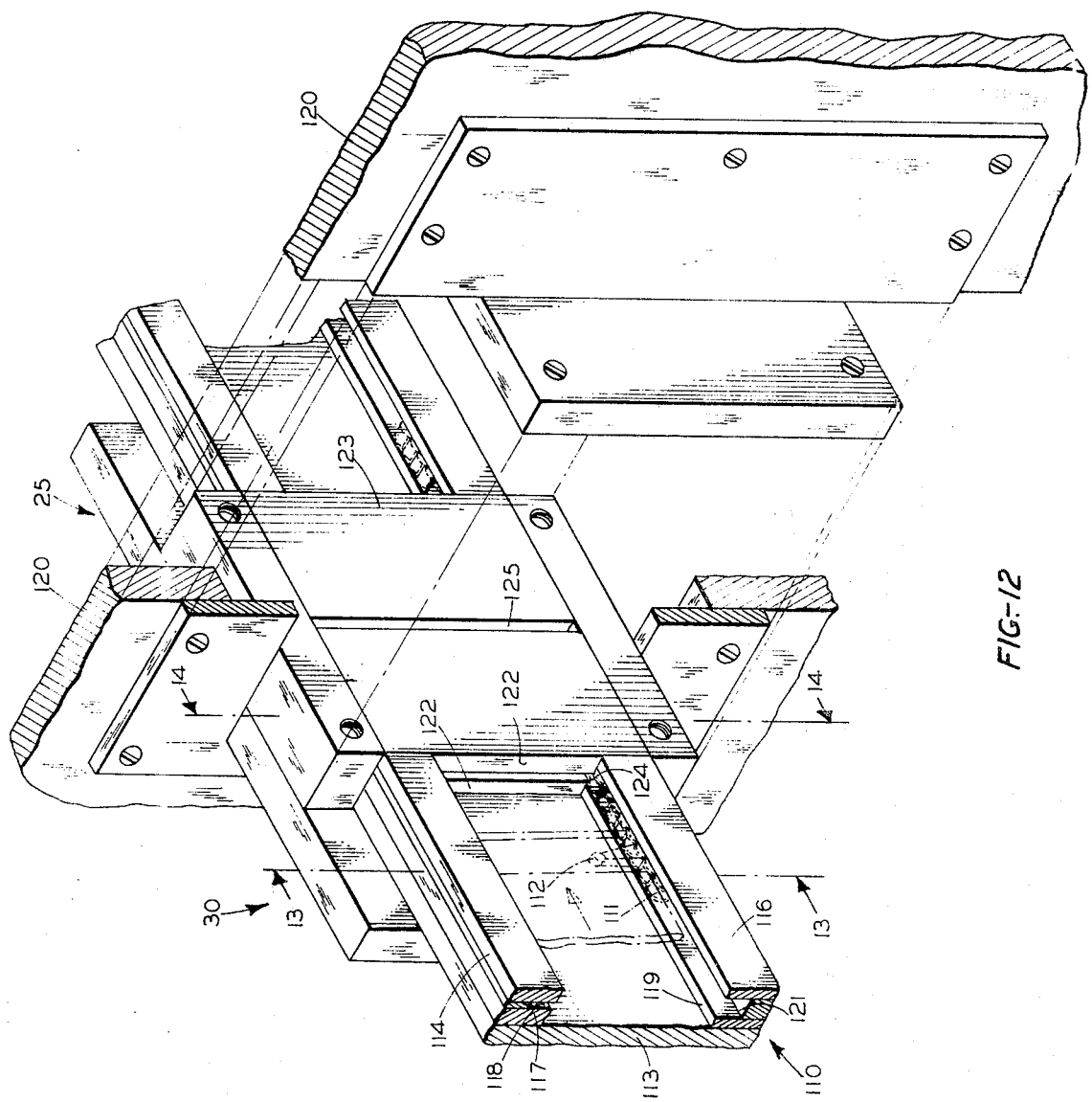

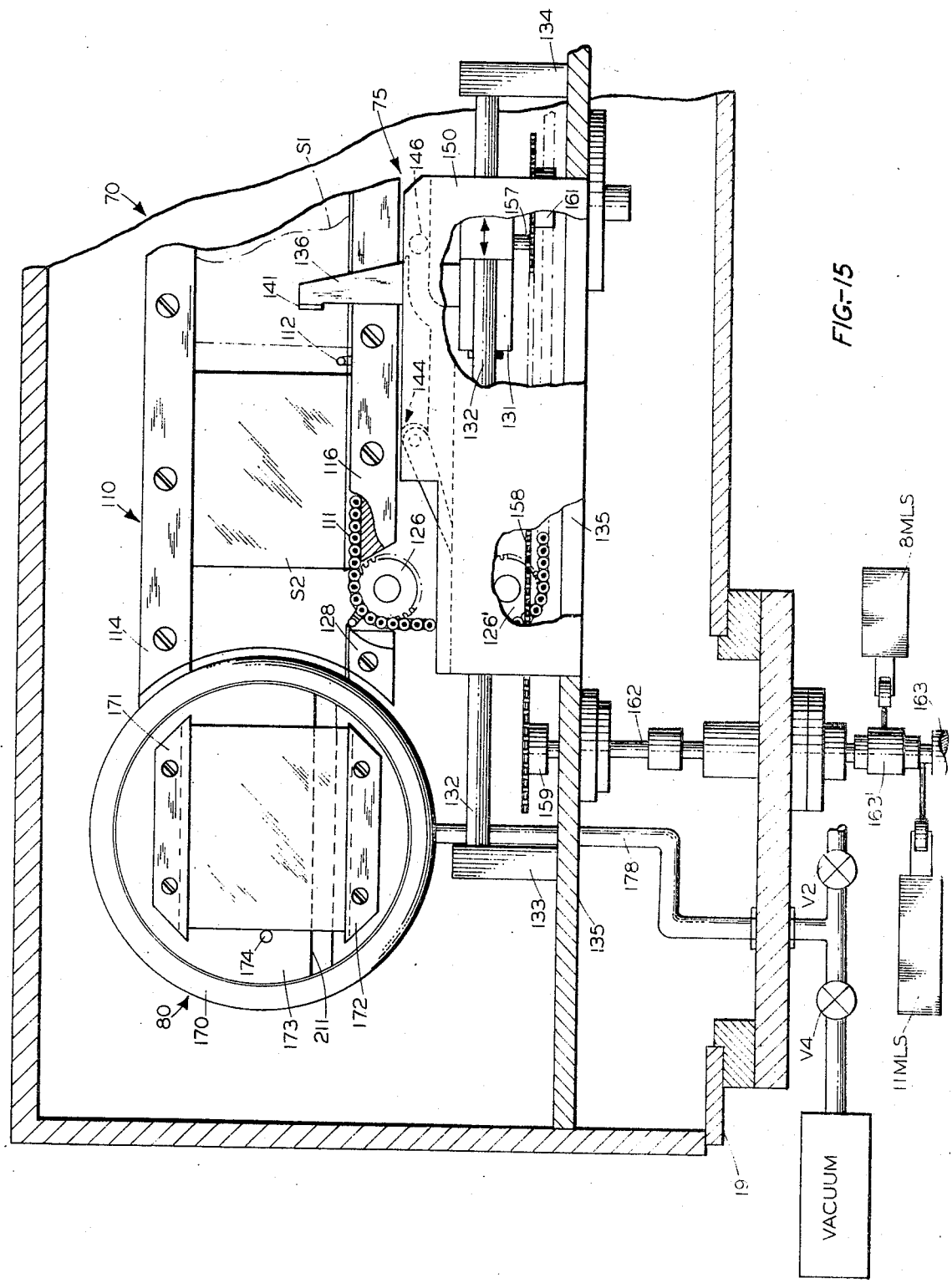

July 28, 1970 R. D. KAUFFMAN ET AL 3,521,765
CLOSED-END MACHINE FOR PROCESSING ARTICLES
IN A CONTROLLED ATMOSPHERE
Filed Oct. 31, 1967 16 Sheets-Sheet 13

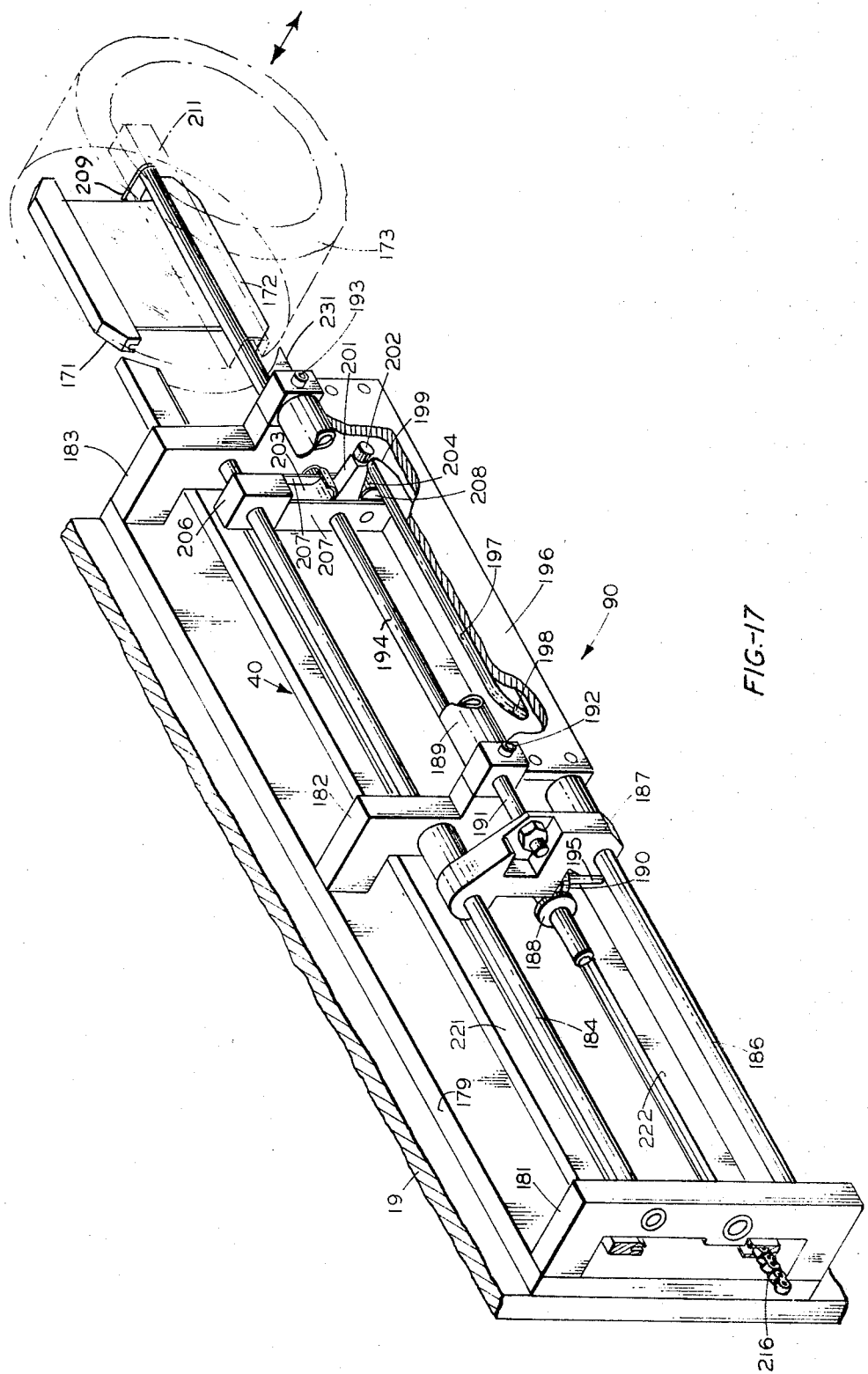

United States Patent Office 3,521,765
Patented July 28, 1970

3,521,765
CLOSED-END MACHINE FOR PROCESSING ARTICLES IN A CONTROLLED ATMOSPHERE
Ronald D. Kauffman, Bethlehem, Robert K. Miller, Macungie, and Frank J. Viola, Bethlehem, Pa., assignors to Western Electric Company, Incorporated, New York, N.Y., a corporation of New York
Filed Oct. 31, 1967, Ser. No. 679,383
Int. Cl. C23c 15/00
U.S. Cl. 214—17
32 Claims

ABSTRACT OF THE DISCLOSURE

An apparatus for depositing a metallized coating onto the surface of a substrate includes a sputtering chamber containing a controlled atmosphere through which the substrates are continuously advanced by an internal conveyor. The sputtering apparatus is provided with entrance and exit transfer and lock units which are located adjacent opposite ends of the internal conveyor. Each transfer unit has a transfer member mounted for reciprocation between a first position outside the chamber to a second position inside the transfer and lock unit. Internal and external sealing means are provided for each transfer unit to allow substrates to be moved into and out of the sputtering chamber without disturbing the controlled atmosphere maintained therein, and feed mechanisms are provided for transferring substrates between the entrance and exit transfer members and the internal conveyor.

BACKGROUND OF THE INVENTION

In the manufacture of thin-film devices for integrated circuitry or circuit components, it is necessary to deposit a layer of metal upon a glass or ceramic substrate. Techniques for depositing a metallic film on a substrate include vacuum processes, such as vapor deposition and cathode sputtering. In the cathode sputtering process, the metal deposition is conducted in an ionized gas atmosphere in a chamber in which a vacuum is maintained.

In order to produce thin-film metallic layers having uniform film characteristics, it is desirable to maintain the vacuum in a sputtering chamber at a predetermined value while advancing substrates continuously through the vacuum processing chamber in such a manner that the vacuum is not affected by the ambient atmosphere. The continuous processing of substrates through the chamber insures that uniform characteristics in the sputtered metallic layers are produced.

One conventional sputtering technique utilizes a bell jar in which a batch of substrates are processed simultaneously. Since the bell jar must be opened after each sputtering operation is completed, in order to remove the processed substrates and replace them with a new batch of unprocessed substrates, and then pumped down to the desired vacuum, the bell jar method is extremely time consuming. The number of substrates which may be processed at one time is limited by the capacity of the bell jar. In addition to these difficulties, the bell jar is susceptible to contamination by the surrounding atmosphere each time it is opened upon completion of a sputtering operation, so that impurities may accumulate on the inner surfaces of the bell jar and the substrate supporting surfaces. For this reason, it is difficult to control the properties of the sputtered metallic film produced by different sputtering operations in the same bell jar.

Continuous processing of substrates has been developed in the prior art to overcome some of the disadvantages of the bell jar method. For example, one method of continuous processing employs an open-ended machine having a sputtering chamber through which substrates are advanced to coat the substrates with a layer of metallic material, such as tantalum nitride or tantalum. The substrates are mounted on individual work carriers which are pushed through an opening in one end of the machine to advance the substrates along a track extending the entire length of the machine. Narrow openings at the entrance and exit ends of the apparatus provide restricted leaks which permit only limited communication with the ambient atmosphere thereby preserving the vacuum level of the atmosphere in the sputtering chamber. Although the open-ended machine eliminates the problem of repeated evacuation of the sputtering chamber, it does not completely solve, however, the problem of contamination by the ambient atmosphere. Impurities can enter the machine through the restricted leaks at its entrance and exit ends and also may be transported into the sputtering chamber by way of the individual work carriers.

Thus a sputtering apparatus which combines the advantages of the bell jar and the open-ended machine, i.e., simultaneous, carrierless deposition in a controlled atmosphere completely isolated from the ambient atmosphere and continuous processing of the substrates, is highly desirable. To avoid the disadvantages of repeated evacuation and exposure to the ambient atmosphere of the sputtering chamber, an apparatus capable of continuous processing of substrates is desirable. In order to substantially reduce the possibility of impurities entering the sputtering apparatus from the ambient atmosphere, a closed-end machine, which does not require individual holding fixtures or carriers for advancing substrates through the sputtering chamber, is required.

SUMMARY OF THE INVENTION

The present invention concerns an apparatus in which vacuum deposition of thin layers of metal or metal compounds, such as tantalum or tantalum nitride, onto the surface of a substrate is performed. The apparatus includes a chamber divided into a plurality of separate sections which are maintained at desired temperature and pressure levels and are entirely isolated from the surrounding atmosphere. Substrates are continuously transported through the chamber on an internal conveyor track extending through bulkheads which separate the chamber sections from one another. Air locks are positioned in openings at the entrance and exit ends of the apparatus for moving articles into and out of the chamber without disturbing the controlled atmosphere therein. An external conveyor advances unprocessed substrates from a load position toward the entrance air lock and moves processed substrates away from the exit air lock toward an unload position.

In its broadest aspects, the invention contemplates an apparatus for continuously advancing articles through a chamber in which a controlled atmosphere is maintained, while preventing the ambient atmosphere from affecting the controlled atmosphere. This result is achieved by providing entrance and exit ports of the chamber with air locks or transfer units through which articles are moved simultaneously to and from a conveyor located within the chamber. Each air lock includes a hollow cylindrical member or barrel mounted in the corresponding port and projecting into the chamber. A movable sealing device mounted within the chamber normally engages the projecting end of the barrel to seal the chamber from the ambient atmosphere. A transfer member provided with article holding means on its front end is mounted for movement into the open end of the barrel. Projecting from the side of the transfer member is a flange which moves into engagement with the open end of the barrel when the transfer member is moved into the barrel to seal the interior of the barrel from the ambient atmosphere.

When the barrel is sealed by both the internal and external sealing devices, a predetermined atmosphere, similar to the controlled atmosphere within the chamber, is supplied to the interior of the barrel whereupon the internal sealing device is moved away from the barrel to expose the transfer member to the controlled atmosphere. Transfer devices located adjacent to the entrance and exit air locks are operated simultaneously to move a first article from the entrance transfer member to the conveyor and a second article from the conveyor to the exit transfer member. Then the internal sealing devices are moved back into engagement with the barrel to reseal the air locks.

Next, ambient atmospheric conditions are established in the barrel, whereafter the transfer members are moved out of the barrel and returned to their initial positions outside of the chamber. In this fashion, the chamber remains constantly isolated from the ambient atmosphere with the internal and external sealing means, respectively, alternately engaging opposite ends of the barrels to prevent the ambient atmosphere from entering the chamber. That portion of the ambient atmosphere which enters the barrel before the external sealing device is moved into engagement with the open end of the barrel is removed from the sealed interior of the barrel prior to the movement of the internal sealing device so that the controlled atmosphere in the chamber is not in any way affected by the ambient atmosphere.

The transfer unit and air lock of the present invention is designed such that the article to be transferred is confined in a relatively small space when both ends of the barrel are sealed. This feature of the invention facilitates the rapid transfer of articles between the ambient atmosphere and the controlled atmosphere in the chamber. Because of the small size of the article receiving space, the atmosphere sealed within the air lock can be easily and rapidly conformed to either the controlled atmosphere within the chamber or the ambient atmosphere outside the chamber. For example, in the operation of the entrance air lock in moving an article from the ambient atmosphere into a vacuum chamber, that portion of the ambient atmosphere sealed within the entrance lock after movement of the transfer member into the barrel can be easily removed from the sealed interior by a vacuum pumping system to reduce the pressure in the air lock to a value substantially equal to the pressure maintained in the chamber. Even if the pressure in the sealed air lock is not reduced exactly to the pressure in the vacuum chamber, the small amount of higher pressure air released into the chamber upon the opening of the internal seal does not significantly affect the vacuum maintained in the chamber.

The entrance and exit transfer units are also designed to transfer articles accurately between predetermined positions adjacent to the internal and external conveyors. The sputtering apparatus includes transfer devices located at opposite ends of the external conveyor for feeding unprocessed articles from the conveyor to a predetermined position on the entrance transfer unit and for removing processed articles from the exit transfer unit and moving them to a predetermined position on the external conveyor. Feed mechanisms are provided at opposite ends of the internal conveyor for moving articles to and from predetermined positions on the internal conveyor. The internal conveyor has facilities for positively engaging the articles to advance them continuously through the processing chamber. The accurate positioning of the articles on the conveyor and the continuous advancement of the articles through the controlled atmosphere in the chamber insures that each of the articles is treated identically to produce uniform properties.

DESCRIPTION OF THE DRAWING

The objects and advantages of the present invention may be more clearly understood by considering the following detailed description in conjunction with the accompanying drawings, wherein:

FIG. 1A is a schematic view in perspective, of the sputtering machine of FIG. 1 illustrating the operating mechanisms of the machine;

FIG. 3 is a top view of the sputtering machine, partially in section, illustrating internal and external conveyor tracks for transporting substrates through the machine and transfer units mounted at each end of the machine for transferring the substrates between the conveyor tracks;

FIGS. 4–6 are sectional perspective views, taken along line 4—4 of FIG. 3, illustrating the operation of the transfer unit located at the entrance end of the sputtering machine;

FIG. 9 is a sectional view, taken along line 9—9 of FIG. 8, showing a safety latch incorporated in the feed mechanism of FIG. 7;

FIG. 10 is an elevational view of the entrance end of the sputtering machine, partially in section, illustrating an internal transport mechanism located adjacent to the entrance transfer unit for moving substrates from the face of the movable transfer member to the internal conveyor track;

FIG. 11 is a plan view of the internal transfer mechanism of FIG. 10 showing a chain and sprocket assembly for operating the mechanism;

FIG. 12 is an exploded, perspective view of a bulkhead separating the sputtering chamber from the preheating chamber and a thermal expansion joint comprising a portion of the internal conveyor track which extends through an opening in the bulkhead;

FIGS. 13 and 14 are sectional views of the internal conveyor track, taken along lines 13—13 and 14—14, respectively, of FIG. 12;

FIG. 15 is an elevational view of the exit end of the sputtering machine, partially in section, illustrating a transfer mechanism located adjacent to the exit transfer unit for moving substrates from the internal conveyor track to the face of the transfer member forming part of that unit;

FIG. 17 is a perspective view of an external transfer mechanism located adjacent to the exit transfer unit for moving substrates from the face of the exit transfer member to the external conveyor track;

DETAILED DESCRIPTION

General description of the apparatus

Figure 1:
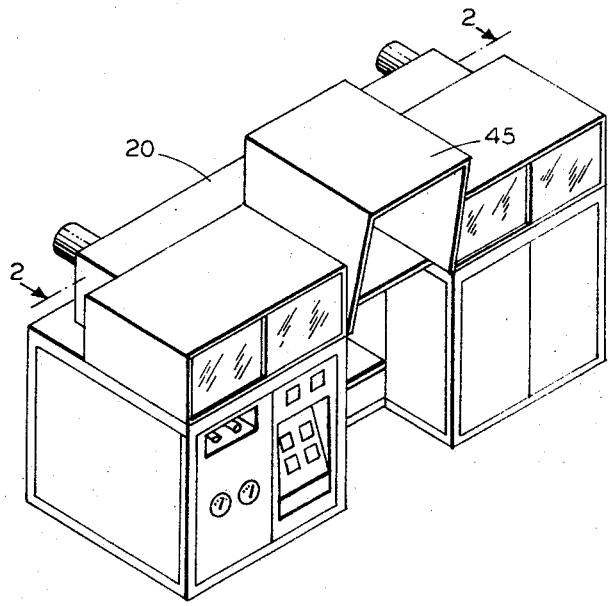
FIG. 1 is a perspective view of the closed-end thin film sputtering machine of the present invention.
Figure 2:
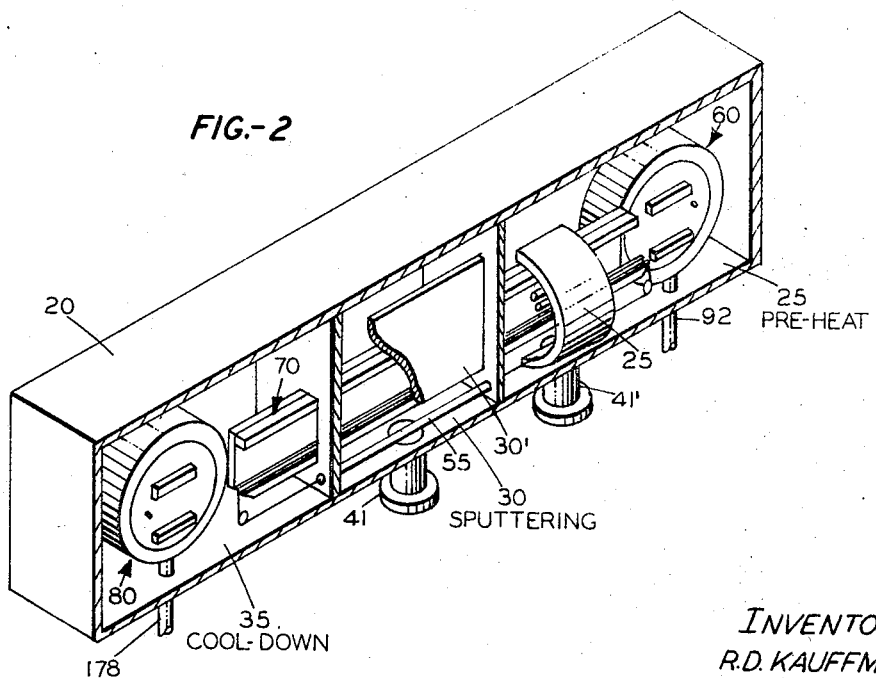
FIG. 2 is a sectional view, taken along line 2—2 of FIG. 1, showing an internal conveyor track along which substrates are moved through preheating, sputtering, and cooling chambers.

In FIG. 1 a perspective view of the sputtering apparatus of the present invention appears. The apparatus includes a chamber 20 (FIGS. 1 and 2) in which are formed a plurality of chamber sections including a preheating section 25, a sputtering section 30, and a cooling section 35. An external conveyor 40 (FIG. 1A) is located outside the chamber 20 and moves from right to left as viewed from the front (operating) side of the machine. Substrates S are placed manually on the external conveyor 40 by an operator located at the center of the sputtering apparatus under a hood 45 (FIG. 1) covering a central portion of the conveyor 40. The substrates are moved to the left by the external conveyor 40 which is advanced intermittently, and when one substrate reaches the end of the conveyor 40 it is positioned on a receiving ledge 229. A transfer mechanism 50 operates to move the substrate from the ledge to a predetermined position on a transfer unit and air lock 60 mounted in an opening 60' in a wall 19 at the entrance end of the apparatus. The air lock 60 includes facilities to transfer the substrate from the ambient atmosphere to a predetermined position within the preheating chamber section 25 while preventing any part of the ambient atmosphere from entering the chamber.

The interior of the chamber 20 is maintained at partial vacuum sources acting through ports 41 and 41' (FIG. 2) located in the preheating and sputtering sections 25 and 30, respectively. Each vacuum source includes a mechanical pump and a diffusion pump which act in combination to maintain the chamber sections at predetermined pressure levels. For example, the pressure in the sputtering section 30 is maintained at a value of approximately 20 microns Hg while the preheating section 25 is maintained at a pressure of approximately 0.5 micron Hg. Since the cooling section 35 is connected to the preheating section 25 by a tube 55 (FIG. 2), the pressure in the cooling section 35 is the same as the pressure in the preheating section 25, i.e., approximately 0.5 micron Hg.

After the substrate is positioned within the preheating section 25, an internal feed mechanism 65 (FIG. 1A) operates to move the substrate from the air lock 60 to an internal conveyor 70 which advances the substrate through the preheating, sputtering, and cooling sections. In the preheating section 25, the substrate is heated to a predetermined temperature (e.g., approximately 250° C.) by a radiant energy heater 25' (FIG. 3). The preheating of the substrate drives off volatile surface contaminates to clean the substrate surface. It also raises the substrate temperature to a level where the substrate surface is rendered suitable for receiving the sputtered material.

From the preheating section 25 the substrate is advanced into the sputtering section 30. The substrate is moved continuously past a cathode 30' maintained at a high negative potential, e.g., approximately −5000 volts. The cathode 30' is composed of the material to be sputtered, e.g., tantalum. The walls of the chamber 20 and the track of the internal conveyor 70 are grounded so that an electron flow is obtained between the cathode 30' and the chamber walls 19 and conveyor track. The electron flow ionizes the inert gas atmosphere supplied to the sputtering section 30, and the resulting positive ions are attracted to the cathode 30'. The ions strike the cathode 30' with sufficient momentum to separate small pieces of material therefrom which are deposited on the substrate surface. In this fashion the substrate surface is covered with a thin-film layer of material.

Next, the substrate is moved into the cooling section 35. In this section the temperature of the substrate and its sputtered, thin-film layer of material is reduced to prevent the sputtered material from reacting with the ambient atmosphere when the substrate is removed from the chamber 20.

When the substrate reaches the end of the conveyor 70, another internal feed mechanism 75 (FIG. 1A) operates to move the substrate to a predetermined position on a second transfer unit and air lock 80 mounted in an opening 80' extending through wall 19 at the exit end of the sputtering apparatus. The air lock and transfer unit 80 removes the substrate from the controlled atmosphere within the chamber section 35 and positions the substrate adjacent to the external conveyor 40. Then a transfer mechanism 90 is operated to move the substrate onto the conveyor 40 which conveys the processed substrate to its initial position where it is manually removed by the operator and replaced by an unprocessed substrate.

External entrance transfer mechanism

Figure 7:
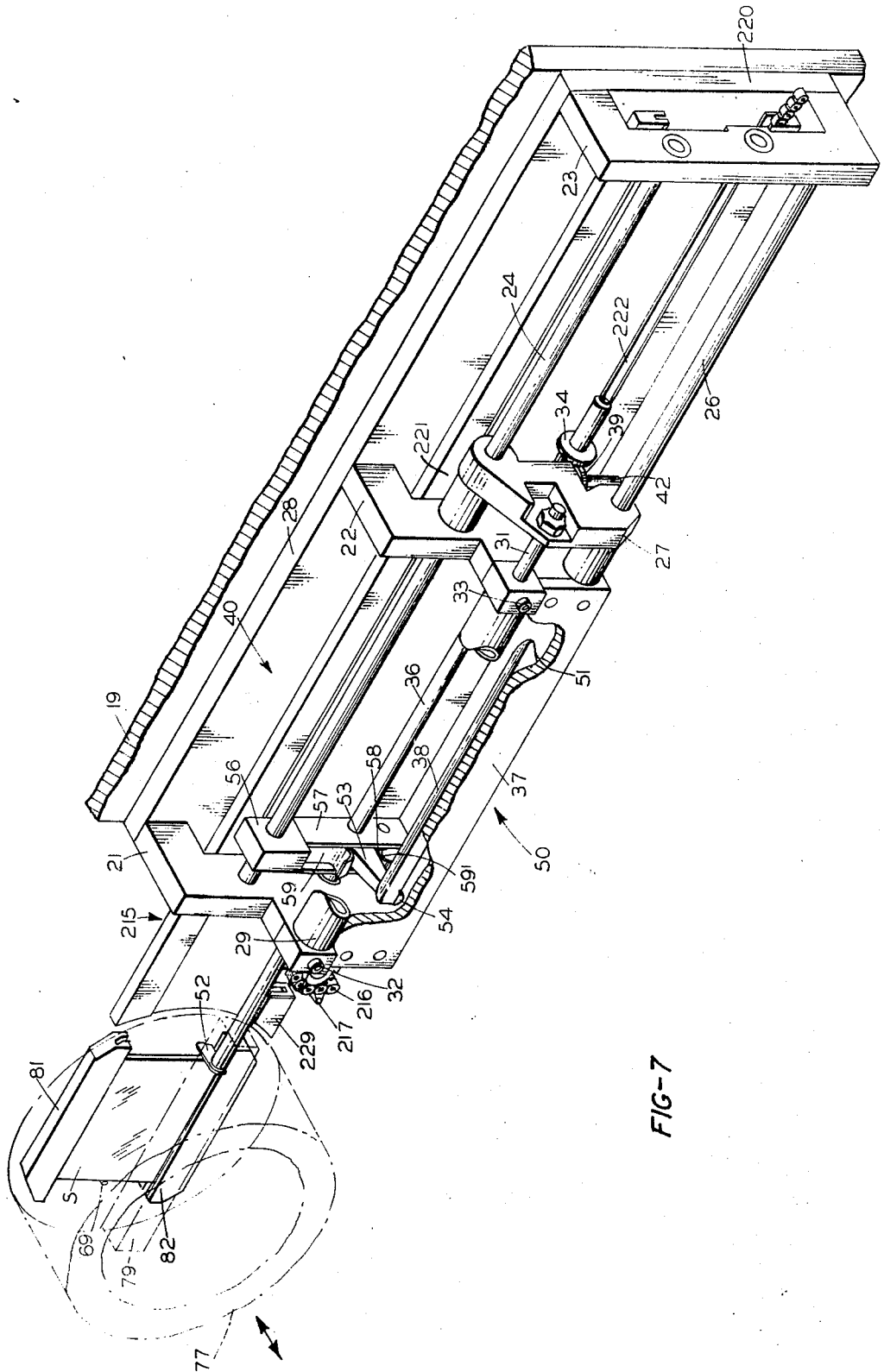
FIG. 7 illustrates, in perspective, a feed mechanism for moving substrates from the external conveyor track to the face of a movable transfer member which is part of the entrance transfer unit.
Figure 8:
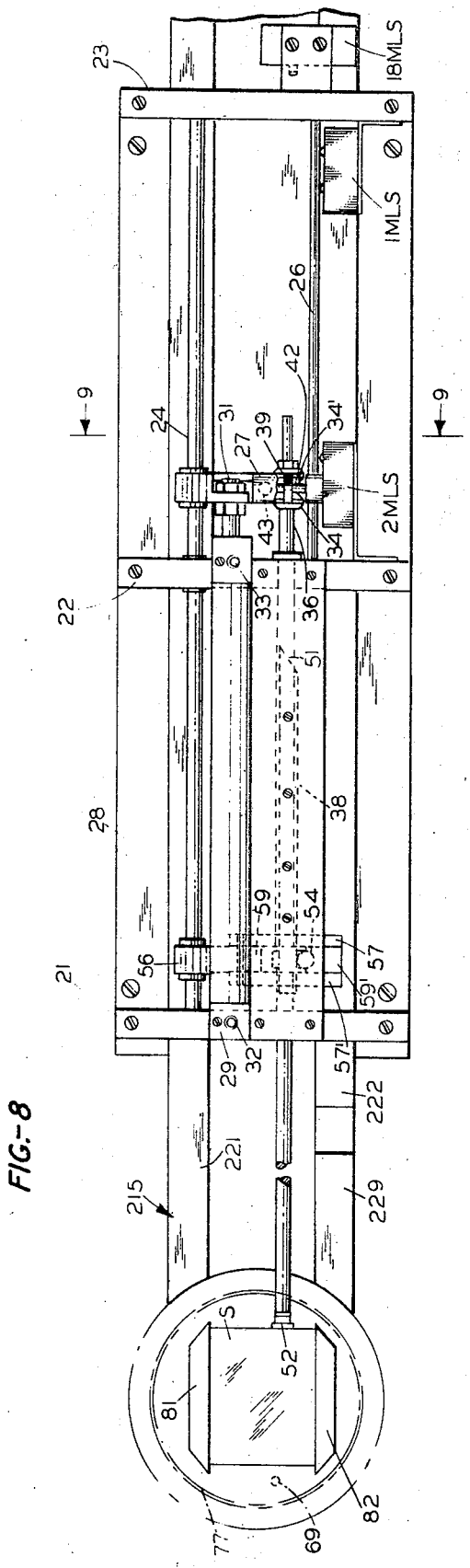
FIG. 8 is a side elevational view of the feed mechanism of FIG. 7 illustrating machine limit switches which form part of a control and interlock circuit for controlling the operation of the sputtering apparatus.

Referring to FIG. 7, the entrance transfer mechanism 50 located at the entrance end of the sputtering apparatus is mounted by brackets 21, 22, and 23 to a plate 28 which is secured to the wall 19 of the chamber 20. The transfer mechanism 50 includes a pair of parallel guide rods 24 and 26. The upper guide rod 24 extends from the bracket 21, through the bracket 22, to the bracket 23. The lower guide rod 26 is secured to the brackets 22 and 23. A movable bracket 27 is mounted for sliding movement along the guide rods 24 and 26. An air cylinder 29 is mounted to the brackets 21 and 22 and has a piston rod 31 extending from its front end and connected to the movable bracket 27. Pressurized air is supplied to the air cylinder 29 through flexible hoses 32 and 33 to impart movement to the piston rod 31 to slide the movable bracket 27 along the guide rods 24 and 26. A shaft 36 is slidably received in bearing openings extending through the brackets 21 and 22 so that the left end of the shaft 36 projects past the bracket 21 toward the end of the external conveyor 40. At the opposite or right end of the shaft 36, a spool 34 having a concave surface 34' (FIG. 8) is secured. A roller 39 mounted on an arm 42, fastened by a pivot pin 42' (FIG. 9) to the movable bracket 27, is urged into engagement with the concave surface 34' of the spool 34 by a spring 43 acting against the arm 42.

The spool 34, roller 39, and pivot arm 42 provide a safety latch, normally connecting the shaft 36 to the movable bracket 27, which disengages when an obstruction is encountered by either the reciprocating shaft 36 or the substrate S. As long as the roller 39 engages the concave surface 34' of the spool 34, the shaft 36 can be reciprocated by applying pressurized air to the air cylinder 29. If an obstruction is encountered while the shaft 36 is moving in either direction, the motion of the shaft 36 terminates but the movable bracket 27 continues to move under the action of the air cylinder 29. As the bracket 27 continues its movement, the roller 39 is moved along the concave surface 34' of the spool 34 to pivot the arm 42 about its pivot pin. As shown in FIG. 9, a latch 44 provided with a notch 46 is also pivotally mounted to the bracket 27 and normally rests on the top end of the pivot arm 42. When the roller 39 reaches either end of the spool 34, the arm 42 is pivoted in a clockwise direction (FIG. 9) by a sufficient amount to move the top end of the arm 42 into registration with the notch 46. At this point, the latch 44, biased downward by a spring 47, is pivoted downward to lock the arm 42 in its pivoted position. The roller 39 is thus held out of engagement with the spool 34 so that the shaft 36 is disconnected from its driving means, the air cylinder 20. After the obstruction is removed, the safety latch must be reset before the transfer mechanism 50 can operate.

Referring again to FIG. 7, a plate 37 is secured to the brackets 21 and 22 and supports a camming member 38 adjacent to the shaft 36. The camming member 38 is in the form of a cylinder having an inclined camming surface 51 located at its right end. A link 53 connected to the shaft 36 projects toward the camming member 38 and terminates in a cylindrical cam follower 54. The cam follower 54 moves over the surfaces of the camming member 38 when the air cylinder 29 is operated to move the shaft 36 relative to the brackets 21 and 22. Projecting downward from a support member 56, slidably received on the guide rod 24, is a pair of side plates 57 and 57′ (FIG. 8) which straddle the link 53. Each side plate has a bore formed therein for receiving the shaft 36. A block 58 is fastened to the lower portions of the side plates 57 and 57′. A pair of curved springs 59 and 59′, projecting from the support member 56 and block 58, respectively, engage upper and lower surfaces of the link 53 such that in its normal position the link 53 projects horizontally from the shaft 36 toward the camming member 38. When the link 53 is in this position, the cam follower 54 is located midway between the upper and lower surfaces of the camming member 38.

A feed finger 52 is mounted to the extended, left end of the shaft 36. When the shaft 36 is moved leftward by drawing the piston rod 31 into the air cylinder 29, the finger 52 engages the edge of a substrate S located on the conveyor 40 and moves the substrate from a feed position on the ledge 229 into a pair of guide members 81 and 82 on the front face of a transfer member 77 forming part of the transfer unit and air lock 60 (FIG. 1A) located at the entrance end of the apparatus.

Assuming that the transfer mechanism 50 has just completed moving a substrate S to the guide members 81 and 82 on the transfer member 77, the shaft 36 and feed finger 52 are in the positions shown in FIG. 7. Then the air cylinder 29 is operated by applying pressurized air to the flexible hose 32 to move the piston rod 31 outward from the air cylinder 29 to move the shaft 36 to the right, away from the entrance opening in the chamber 20. At this time, the cam follower 54 moves along the lower surface of the camming member 38. As the piston rod 31 approaches its completely extended position, the cam follower 54, biased upward by the spring 59′, moves along the inclined surface 51 of the camming member 38 and rotates the shaft 36 in a clockwise direction. This rotation of the shaft 36 moves the projection 52 out of the path of the conveyor 40 so that it does not interfere with movement of the next substrate along the conveyor 40. When the piston rod 31 reaches its completely extended position, the link 53 is held in its normal, horizontal position intermediate the upper and lower surfaces of the camming member 38 by the springs 59 and 59′.

Next, a substrate is moved to the feed position on the ledge 229 by a lug 217 mounted on a chain 216 which is part of the external conveyor 40. The chain 216 is advanced by a motor 213 to move the lug 217 into engagement with a substrate at the load position on the conveyor 40 to advance the substrate to the ledge 229. Then, pressurized air is applied to the air cylinder 29 through the flexible hose 33 to move the piston rod 31 in the opposite direction into the air cylinder 29. This movement of the piston rod 31 advances the shaft 36 to the left, toward the entrance opening, and moves the cam follower 54 into engagement with the inclined camming surface 51. The cam follower 54 moves downward along the inclined surface 51 rotating the shaft 36 in a counterclockwise direction such that the projection 52 is moved behind the substrate which has reached the feed position (FIG. 1A) on ledge 229 at the end of the conveyor 40. As the shaft 36 is further advanced by movement of the piston rod 31, the feed finger 52, held behind the substrate when the cam follower 54 moves along the lower surface of the camming member 38, pushes the substrate S along the ledge 229 which guides the substrate into the guide members 81 and 82. A groove 79 formed across the front face of the transfer member 77 receives the feed finger 52 and extended portion of the shaft 36. A limit pin 69 (FIGS. 7 and 10), projecting from the front face of the transfer member, defines an extreme position past which the substrate S cannot be moved.

When the substrate S is moved onto the transfer member, the transfer mechanism 50 is in the position shown in FIG. 7. Then the piston rod 31 is moved outward from the air cylinder 29, as described above, to prepare the transfer mechanism 50 for the next transfer operation.

Entrance air lock and transfer unit

FIGS. 4, 5, and 6 illustrate the transfer unit 60 which is located in an opening 60′ at the entrance end of the sputtering apparatus. The transfer unit 80, which is located in an opening 80′ at the exit end of the sputtering apparatus, is identical to transfer unit 60 so that it is only necessary to describe one of the transfer units in detail. Referring to FIG. 4, the transfer unit and air lock 60 include a barrel or hollow cylinder 61 which is mounted in an entrance opening 60′ in the chamber wall 19 and projects into the chamber section 25. The barrel 61 fits snugly into the entrance opening 60′ and has a flange 62 formed at one end which engages the chamber wall 19 and forms an air-tight seal which prevents any part of the ambient atmosphere from entering the chamber.

A movable sealing device 63, in the form of a hollow cover or cap having an opening extending inward from its front end, is located within the chamber section 85. The sealing device or cap 63 is mounted on a piston rod 64 extending from an air cylinder 66. The air cylinder 66 is located outside the chamber 20, and the piston rod 64 projects into the chamber section 25 through an opening 67 formed in a side wall of the chamber 20 opposite the entrance opening. A plate 68 is mounted to the chamber wall and covers the opening 67 to seal the chamber 20 from the ambient atmosphere. The plate 68 also serves as a support for the air cylinder 66. Expandable bellows 71 join the sealing device 63 to the plate 68 and prevent the surrounding atmosphere from entering the chamber 20 through a bore in the center of the plate 68 which receives the piston rod 64.

The sealing device or cap 63 has a flat front surface 72 which faces the projecting end of the barrel 61. The sealing device 63 also has a peripheral rim 73 projecting from its front surface 72 which defines an article receiving space or bore in the front, open end of the sealing device 63. The rim 73 has the same cross-sectional dimensions as the barrel 61. As shown in FIG. 6, a resilient sealing ring 74 is mounted on the projecting end of the barrel 61 so that when the sealing device 63 is in its normally closed position (FIG. 4), rim 73 engages the projecting end of the barrel 61 and the resilient ring 74 to seal the chamber 20 from the ambient atmosphere. As shown in FIG. 4, when the sealing device 63 is located in this position, the barrel 61 together with the rim 73 and the front surface 72 of the sealing device 63 form a cell-like structure which projects into the chamber section 25.

The transfer member 77 is slidably mounted adjacent to the open end of the barrel 61 on guide rods 78 (FIGS. 3 and 4) projecting from the flange 62 of the barrel 61. The transfer member 77 is in the form of a hollow cylindrical member having an outer diameter which is slightly less than the inner diameter of the barrel 61. The front end of the transfer member 77 is a flat surface to which are secured slotted guide members 81 and 82. The guide members 81 and 82 serve as article holding means for receiving a substrate which is transferred from the exterior conveyor 40 by the entrance transfer mechanism 50.

A flange or sealing rim 83 extends outward from the sides of the transfer member 77 at its opposite end. A second resilient sealing ring 84 is mounted on the outer flange 62 of the barrel 61. The transfer member 77 is connected to a piston rod 86 extending from an air cylinder 87. Pressurized air is supplied to the air cylinder 87 through a pair of flexible hoses 88 and 89 to impart movement to the transfer member 77 relative to the barrel 61. When the transfer member 77 is moved completely into the barrel 61 (FIG. 5), the resilient sealing ring 84 engages the flange or sealing rim 83 or transfer member 77 to seal the interior of the barrel from the ambient atmosphere. At this point, a substrate S held by the guide members 81 and 82 is positioned between the feed mechanism 65 and the internal conveyor 70 (FIG. 10). Since the outer diameter of the transfer member 77 is only slightly less than that of the inner diameter of the barrel 61, the substrate S is confined in a relatively small space when both the first and second resilient sealing rings 74 and 84 are in contact with flange 83 and rim 73 sealing the interior of the barrel 61 from the ambient atmosphere and from the controlled atmosphere within the chamber 20.

The barrel 61 is provided with a port 91 to which a line 92 (FIGS. 2, 4, and 10) is connected. Referring to FIG. 10, the line 92 is separated into two sections, one of which is connected through a direct acting solenoid valve V3 to a source of controlled atmosphere, e.g., a vacuum source. The vacuum source may include a mechanical pump and a Roots blower acting in combination to control the pressure within the air lock 60. The other section of the line 92 is connected through a normally closed solenoid valve V1 to a line which is open to the ambient atmosphere. When the first and second resilient sealing rings 74 and 84 are in engagement with flange 83 and rim 73, respectively, the valve V3 is opened to permit the vacuum source to reduce the pressure within the confined space enclosed by the transfer member 77, the barrel 61, and the sealing cap 63 to a value which is substantially the same as the pressure within the chamber section 25. Then the air cylinder 66 is operated by applying pressurized air to the hose 258 to move the piston rod 64 into the air cylinder 66. Thus, the sealing device 63 is moved away from the projecting end of the barrel 61 to expose the front face of the transfer member 77 and the substrate S to the controlled atmosphere within the chamber section 25. At this point, the transfer mechanism 65 (FIG. 10) is operated to move the substrate S from the transfer member 77 to the internal conveyor 70.

After the substrate S is transferred from the transfer member 77, the air cylinder 66 is operated by applying pressurized air to the hose 259 to move the sealing device 63 back into engagement with the resilient sealing ring 74 on the barrel 61 to seal its interior from the controlled atmosphere within the chamber section 25. Then the valve V1 is opened to allow the ambient atmosphere to enter the interior of the barrel 61. Finally, the air cylinder 87 is operated by applying pressurized air to hose 89 thereby drawing the piston rod 86 into the air cylinder 87. This movement of the piston rod 86 moves the transfer member 77 out of the barrel 61 and returns the transfer member to its initial position outside the chamber 25 where it is prepared to receive another substrate from the external conveyor 40.

Internal entrance transfer mechanism

The internal entrance transfer mechanism 65 (FIG. 10) is utilized to move a substrate S from the front face of the transfer member 77 to the internal conveyor 70. The transfer mechanism 65 includes a slide 93 which is mounted for sliding movement along a pair of supporting rods 94 (FIG. 11) mounted to a platform 100 by brackets 96 and 97. The platform 100 is fixed to the walls of the chamber 20. Projecting upward from the slide 93 is an arm 98 having a feed finger 99 projecting at right angles therefrom toward the transfer unit 60. As shown in FIG. 10, the slide 93 and the arm 98 are normally located to the right of the transfer unit 60.

Projecting downward from the slide 93 is a drive pin 101 which engages a chain 102 fitted on a pair of sprockets 103 and 104 rotatably mounted on the platform 100 beneath the supporting rods 94. The sprocket 104 is connected to a shaft 106 which is driven by a commercially available rotary output air cylinder 107. The rotary air cylinder 107 rotates the shaft 106 and the sprocket 104 one complete revolution in a clockwise direction, as viewed in FIG. 11, to advance the chain 102 which drives the slide 93 toward the conveyor 70. As the slide 93 moves in this direction, the feed finger 99 engages the edge of a substrate S, held on the transfer member 77 by the slotted guide members 81 and 82, and pushes the substrate S toward the conveyor 70. The slotted guide members 81 and 82 guide the substrate S onto a conveyor track 110 which forms part of the conveyor 70. One revolution of the shaft 106 and the sprocket 104 imparts suffiicent longitudinal motion to the slide 93 to move the substrate S to the position shown by phantom lines in FIG. 10. At this point, the substrate S is in a position from which it can be advanced by the conveyor 70.

When the shaft 106 has completed one clockwise revolution, the motion of the rotary air cylinder 107 is reversed. The shaft 106 is then rotated one complete revolution in the counterclockwise direction (FIG. 11) to return the slide 93 to its initial position to the right of the transfer unit 60 where it is ready to transfer another substrate from the transfer member 77 to the conveyor 70.

Internal conveyor

The internal conveyor 70 advances substrates at a predetermined rate of speed from the entrance end of the sputtering apparatus through the preheating, sputtering, and cooling sections of the chamber 20 to the exit end of the apparatus. The internal conveyor 70 includes a conveyor track 110 (FIGS. 10, 12, and 15) along which the substrates are moved by an endless chain 111. The chain is supported by sprockets 115 and 115' (FIG. 10), at the entrance end of the apparatus, and by sprockets 126 and 126' (FIG. 15) at the exit end. The chain 111 is continuously advanced by a motor 105 (FIG. 3) connected to the chain 111 through a clutch-brake unit 109. Equidistantly spaced along the chain 111 are a plurality of lugs 112 (FIG. 10) which project perpendicularly from the chain 111. The projecting lugs 112 serve as pushing elements for positively engaging the substrates to advance them along the conveyor 70. The lugs 112 also insure that a minimum spacing is maintained between substrates on the conveyor track 110 to facilitate the removal of the substrates by the transfer mechanism 75 at the exit end of the apparatus.

As shown in FIG. 3, the conveyor track 110 is divided into three sections, each of which is located in one of the chamber sections 25, 30, and 35. The track 110 includes a plate 113 (FIGS. 10, 12 and 13) to which upper and lower guide rails 114 and 116, respectively, are secured. The upper guide rail 114 is spaced from and parallel to an upper railing 117 (FIGS. 12 and 13) to define a slot 118 which is in alignment with the slot in the guide member 81 on the front face of the transfer member 77. The lower guide rail 116 is spaced from and parallel to a lower railing 119 to define an elongated slot 121 for receiving the chain 111. The elongated slot 121 is in alignment with the slot in the guide member 82. When a substrate S is moved from the transfer member 77 onto the conveyor track 110 by the transfer mechanism 65, the lower edge of the substrate S rests upon the chain 111, while the upper edge of the substrate S projects into the slot 118 (FIG. 13). As the chain 111 is advanced along the slot 121, the substrate S is limited to movement in a straight line along the parallel slots 118 and 121.

Referring to FIGS. 10 and 11, a guide 127 is attached to the plate 113 adjacent to the transfer unit 60 and spaced from the end of the lower guide rail 116 to provide a space for the sprocket 115. A tapered receiving slot (FIG. 11) is formed in the top surface of the guide 127 to establish a funnel-shaped passage through which substrates are advanced from the transfer unit 60 to the conveyor track 110. The narrowest portion of the tapered slot is located at the edge of the guide 127 which faces the conveyor chain 111. Thus, when a substrate is moved from the transfer member 77 by the transfer mechanism 65, it passes through the funnel-shaped passage which guides the substrate to the center of the chain 111. The guide 127 may be oriented in a slightly inclined position to lift the substrate relative to the chain 111 as it passes through the tapered slot.

When a substrate S advancing along the conveyor 70 reaches the bulkhead 120 separating the preheating section 25 from the sputtering section 30, the substrate S passes through a restricted passage, shown in FIG. 12, which is located in an opening in the bulkhead. The restricted passage is formed by two sets of spaced, parallel plates 122—122 and 123—123. As shown in FIG. 12, the plates 123—123 are located in the preheating chamber section 25 and are spaced apart to form a narrow opening through which the substrate S is moved from the preheating section 25 to the sputtering section 30. Similarly, the plates 122—122 are located in the sputtering section 30, and the space therebetween forms a continuation of the opening between the plates 123—123. As shown in FIGS. 12 and 14, the bottom sections of the plates 122—122 and 123—123 are indented such that a slot 124, formed therebetween, is wider than the other portion of the opening between the plates to allow the chain 111 to pass through the restricted passage.

The conveyor track 110 which is located within the sputtering chamber section 30 terminates at the parallel plates 122—122 such that the slot 118 is in registration with the upper portion of the opening between the plates 122—122 and the slot 121 is in alignment with the slot 124. In similar fashion, the conveyor track 110 located within the preheating section 25 abuts the plates 123—123 such that the slots 118 and 121 formed therein are in alignment with the opening formed between the plates 123—123. It should be noted that a space 125 (FIG. 12) is provided between the two sets of plates 122—122 and 123—123 to allow for expansion of the sections of the track 110, located within the chamber sections 25 and 30, resulting from the heat generated within the preheating section 25.

As soon in FIG. 3, a restricted passage is also located in the bulkhead 130 which separates the sputtering section 30 from the cooling section 35. The structure of this restricted passage is identical to the structure of the restricted passage located in the bulkhead 120 which is illustrated in FIG. 12. Thus, the only openings in the walls of the sputtering section 30 are the narrow openings between the plates 122—122 and 123—123 of the restricted passages located at opposite ends of the sputtering section 30. These narrow openings in the restricted passages limit the movement of gas between the sputtering section 30 and the adjoining chamber sections.

In order to prevent impurities from entering the sputtering section 30 through the restricted passages, the pressures (0.5 micron Hg) maintained in the preheating section 25 and the cooling section 35 are lower than the pressures (20 microns Hg) within the sputtering section 30. The preheating section 25 and the cooling section 35 act as buffer zones which prevent the infiltration of impurities into the sputtering section 30. Since the pressure within the sputtering section 30 is greater than the pressures in the adjoining sections, the resultant gas flow will be outward from the sputtering section 30 through the restricted passages into the preheating and cooling chamber sections.

The conveyor 70 transports substrates through the preheating chamber section 25 past a heater 25′ (FIG. 3) which raises the surface temperature of the substrate to a desired level (e.g., 250° C.) to drive off volatile surface contamination and to provide a substrate surface which is suitable for receiving sputtered material. The substrates are moved by the conveyor 70 from the preheating chamber section 25 through the restricted passage in the bulkhead 120 into the sputtering chamber section 30 where the surfaces of the substrates are coated with a layer of sputtered material. Then the substrates are moved through the restricted passage in the bulkhead 130 to the cooling chamber section 35 maintained at a reduced temperature by water-cooled units (not shown). Thus, the temperature of the substrates and the sputtered material is decreased to prevent the sputtered material from reacting with the atmosphere when its is moved into the ambient atmosphere by the transfer unit 80.

Referring to FIG. 15, the portion of the conveyor track 110 located at the exit end of the sputtering apparatus includes a guide 128, similar to the guide 127 (FIGS. 10 and 11), mounted on the plate 113. The guide 128 is spaced from the edge of the guide rail 116 to provide a space for the sprocket 126. The guide 128 has a tapered slot formed in its upper surface to establish another funnel-shaped passage through which a substrate is advanced. The narrowest portion of the tapered slot faces the slotted guide member 172 so that as the substrate passes through the tapered slot of the guide 128, it is guided to the slots formed in the guide members 171 and 172.

Internal exit transfer mechanism

Figure 16:
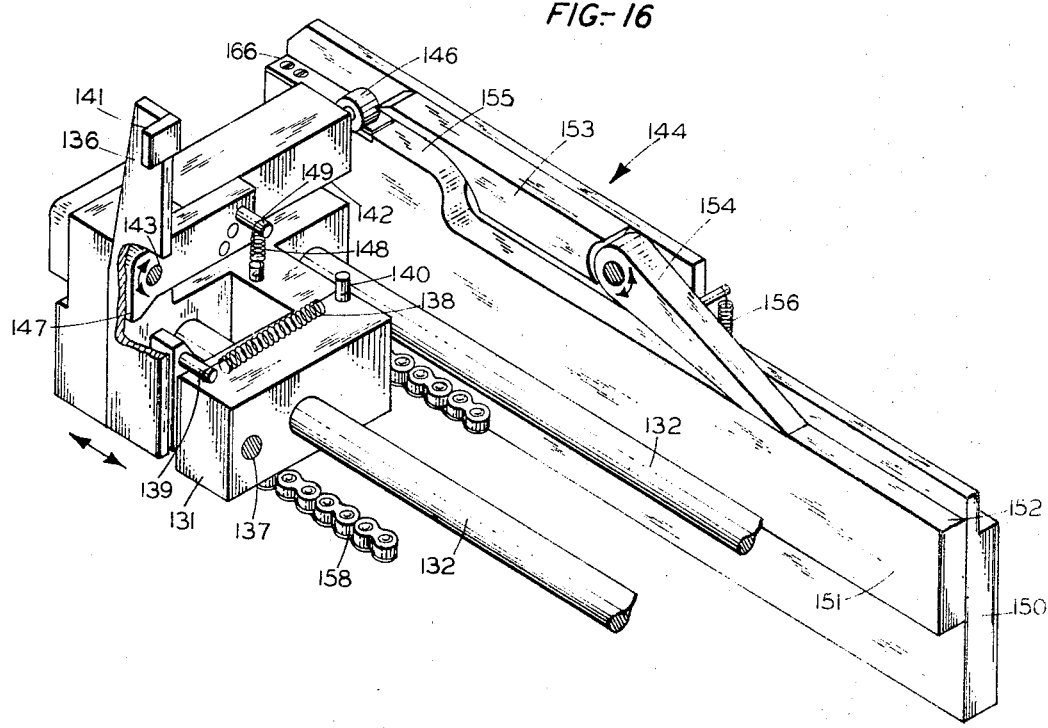
FIG. 16 is a perspective view of a camming track and follower for operating the transfer mechanism of FIG. 15.

The internal exit transfer mechanism 75 (FIG. 15) moves the substrates from the internal conveyor 70 to the front face of a transfer member 173 which forms part of the transfer unit 80 located at the exit end of the sputtering apparatus. The transfer mechanism 75 includes a block 131 (FIGS. 15 and 16) which is slidably mounted upon a pair of guide rods 132 secured to a platform 135 by brackets 133 and 134. The platform 135 is fixed to the walls of the chambers 20. An arm 136 is pivotally mounted to the block 131 by a pivot pin 137 (FIG. 16) and projects upward from the block 131. A tension spring 138 having one end secured to a pin 139 projecting from the arm 136 and its other end secured to a pin 140 attached to the block 131 applies a force to the arm 136 which tends to move the arm 136 in a clockwise direction about the pivot pin 137, as viewed in FIG. 16. A feed finger 141 extends from the top portion of the arm 136 in the direction of the transfer unit 80.

A lever 142 is also pivotally mounted on the block 131 by a pivot rod 143. The lever 142 projects from the block 131 in a direction opposite to the feed finger 141 toward a camming device 144. At the projecting end of the lever 142 a cam follower 146 is mounted to follow a predetermined path formed in the camming device 144 when the block 131 is moved along the guide rods 132. At the opposite end of the lever 142, which is mounted on the pivot rod 143, a short feed finger actuator leg 147, attached to lever 142, projects downward at a right angle from the lever 142. The arm 136 is biased toward the actuator leg 147 by the spring 138 and when the lever 142 is in the position shown in FIG. 16, the arm 136 is held in a vertical position by the spring 138. A spring 148 attached to the block 131 is connected to a stud 149 projecting from the side of the lever 142. The spring 148 applies a downward force to the lever 142 which urges the lever 142 in a clockwise direction about the pivot rod 143.

The camming device 144 includes a plate 151 having a camming surface 152 (FIG. 16) formed along its top edge. The plate 151 is mounted on a flat supporting member 150 which is secured to the platform 135. A short portion 155 of the camming surface 152 located at the left end of the plate 151 is raised from the main portion of the camming surface 152. When the cam follower 146 rests upon this raised portion 155 of the camming surface 152, the lever 142 is located in a horizontal position and the leg 147 is not in contact with the arm 136. The camming device 144 includes a ledge 153 secured to the supporting member 150 above the plate 151. The bottom surface of the ledge 153 and the camming surface 152 define a path or track for guiding the movement of the cam follower 146 as the block 131 is moved along the guide rods 132. One end of the ledge 153 terminates over the raised portion 155 of the camming surface 152. Pivotally mounted adjacent to the opposite end of the ledge 153 is a tapered arm 154 which is urged downward into engagement with the lower portion of the camming surface 152 by a spring 156. The top surfaces of the ledge 153 and the tapered arm 154 define another path for guiding the movement of the cam follower 146.

Projecting downward from the block 131 is a drive pin 157 (FIG. 15) which engages a chain 158 fitted on sprockets 159 and 161 rotatably mounted beneath the guide rods 132. The sprocket 159 is attached to a shaft 162 driven by another rotary output air cylinder 163. The rotary air cylinder 163 turns the shaft 162 one complete revolution to advance the chain 158 and drive the block 131 along the guide rods 132 at a rate of speed greater than the predetermined speed of the conveyor 70. As the block 131 moves toward the transfer unit 80, the cam follower 146 moves along the raised portion 155 of the camming surface 152 beneath the leading edge of the ledge 153. As long as the cam follower 146 remains on the raised portion 155 of the camming surface 152, the arm 136 is held in a vertical position by the spring 138. In this position, the feed finger 141 is out of the path of movement of the substrates along the conveyor track 110 so that the feed finger 141 is free to move past a first substrate S1. When the cam follower 146 reaches the edge of the raised portion 155 of the camming surface 152, the cam follower 146 drops downward to pivot the lever 142 in a clockwise direction, as viewed in FIG. 16. As a result of this pivoting movement of the lever 142, the actuator leg 147 pivots into engagement with the arm 136 and pivots the arm 136 about pivot rod 143 in a counterclockwise direction to move the feed finger 141 toward the conveyor track 110. At this point, the feed finger 141 is located between substrates S1 and S2, spaced apart on the conveyor track 110 by the lug 112 and moves into the space between the substrates S1 and S2 behind the trailing edge of the substrate S2.

As the movement of the block 131 along the guide rods 132 continues, the cam follower 146 is moved along the lower portion of the camming surface 152 and the feed finger 141 advances the substrate S2 toward the transfer unit 80. Slotted guide members 171 and 172 (FIG. 15) are mounted on the front face of the transfer member 173 which forms part of the transfer unit 80. The slotted guide members 171 and 172 are in alignment with the upper and lower guide rails 114 and 116 of the conveyor track 110. When the substrate S2 is moved from the conveyor track 110 it advances through the tapered slot in the guide 128 into the slots formed in the guide members 171 and 172. As the cam follower 146 moves beneath the tapered arm 154 (see again FIG. 16), the tapered arm 154 pivots upward against the bias of the spring 156 to allow the cam follower 146 to move freely along the camming surface 152. When the cam follower 146 has moved past the tapered arm 154, the spring 156 returns the tapered arm 154 into engagement with the camming surface 152.

When the shaft 162 has made one complete revolution, the block 131 has moved a sufficient distance to the left to move the substrate S2 completely onto the guide members 171 and 172. A locator pin 174, projecting from the front face of the transfer member 173, defines an extreme position past which the substrate cannot be moved. The transfer mechanism 75 is designed to move the substrate S2 to a desired position on the guide members 171 and 172, short of the locator pin 174. The locator pin 174 prevents the substrate S2 from moving past the desired position. The transfer mechanism 75 and the locator pin 174 insure that the substrate S2 is moved to a position completely on the front face of the transfer member 173. When the substrate is located in such a position, it does not interfere with movement of the transfer member 173 through the barrel 170.

Next, the rotary air cylinder 163 is reversed to turn the shaft 162 one complete revolution in the opposite direction to return the block 131 toward its initial position on the guide rods 132. As the cam follower 146 moves back along the camming surface 152, it encounters the tapered arm 154 which is held in engagement with the camming surface 152 by the spring 156. The cam follower 146 moves upward along the upper, inclined surface of the tapered arm 154 thereby pivoting the lever 142 in a counterclockwise direction against the bias of the spring 148 to move the actuator leg 147 out of engagement with the arm 136. With the leg 147 moved away from the arm 136, the tension spring 138 applies a force to the arm 136 which pivots about pivot rod 143 in a clockwise direction away from the conveyor track 110 to move the feed finger 141 out of the path followed by the substrates advancing along the continuously moving conveyor 70. As movement of the block 131 continues, the cam follower 146 moves along the upper surface of the ledge 153 and the arm 136 is held away from the conveyor track 110 by the spring 138 so that the feed finger 141 does not interfere with the movement of the advancing substrates. When the cam follower 146 reaches the edge of the ledge 153, the cam follower 146 drops toward the raised portion 155 of the camming surface 152 into engagement with a shock absorbing leaf spring 166, mounted to the raised portion 155 of the camming surface 152, which prevents the cam follower 146 from rebounding from that surface. When the cam follower 146 reaches this position, the shaft 162 has turned one complete revolution and the block 131 and the arm 136 are in their initial positions and are prepared to advance another substrate from the conveyor 70 to the transfer member 173.

Exit air lock and transfer unit

FIGS. 1A, 2, 3, 15 and 17 illustrate a transfer unit and air lock 80 which is located in an opening at the exit end of the sputtering apparatus. As mentioned earlier in the specification, the structure of the transfer unit 80 is identical to the structure of the transfer unit 60 located at the entrance end of the sputtering apparatus. The operation of the transfer unit 80 is substantially the same as that of the transfer unit 60 except that substrates are removed from the controlled atmosphere within the cooling section 35 and are transferred to the ambient atmosphere without disturbing the controlled atmosphere within the chamber section 35.

The transfer unit or air lock 80 includes a barrel 170 mounted in an opening at the exit end of the chamber 20 and a transfer member 173 (FIGS. 15 and 17) provided with upper and lower guide members 171 and 172, respectively, for receiving and holding a substrate. Projecting from the front surface of the transfer member 173 is a locator pin 174 which limits substrate movement in the slotted guide members 171 and 172. The transfer member 173 is mounted for sliding movement into and out of the barrel 170 along a pair of guide rods 175 (FIG. 3). An air cylinder 176 is utilized to impart movement to the transfer member 173 along the guide rods 175.

The transfer unit 80 also includes an internal sealing device or cap 180 which is similar to the movable sealing device 63, shown in FIGS. 4–6. The internal sealing device 180 of the transfer unit 80 is operated by an air cylinder 177 (FIG. 3), mounted outside the chamber 20 at the exit end of the sputtering apparatus.

The barrel 170 is provided with a port to which a line 178 (FIG. 15) is connected. The line 178 is separated into two sections, one of which is connected to a source of controlled atmosphere, e.g., a vacuum source, through a solenoid-operated valve V4. The other section of the line 178 is connected through a normally closed solenoid valve V2 to a line which is open to the ambient atmosphere.

After the substrate has been moved from the internal conveyor 70 to the transfer member 173 by the transfer mechanism 75, the internal sealing device 180 of the transfer unit and air lock 80 is operated to seal the substrate in a confined space within the air lock. Then the interior of the air lock 80 is vented by opening valve V2 to allow a portion of the ambient atmosphere to enter the confined space. Finally, the transfer member 173 is moved out of the air lock 80 to remove the substrate from the cooling section 35 into the ambient atmosphere. At the entrance end of the sputtering apparatus the transfer unit 60 operates to move substrates from the ambient atmosphere into the preheating chamber 25 without disturbing the controlled atmosphere maintained within the chamber 25.

External exit transfer mechanism

The external exit transfer mechanism 90, shown in detail in FIG. 17, is located outside the cooling section 35 adjacent to the transfer unit 80 and is used to move substrates from the transfer member 173 to the external conveyor 40. The transfer mechanism 90 is mounted by brackets 181, 182, and 183 to a plate 179 which is secured to the chamber 20. The transfer mechanism 90 includes a pair of parallel guide rods 184 and 186. The upper guide rod 184 extends from the bracket 181, through the bracket 182, to the bracket 183. A lower guide rod is secured to the brackets 181 and 182. A movable bracket 187 is mounted for sliding movement along the guide rods 184 and 186. An air cylinder 189 mounted to the brackets 182 and 183 has a piston rod 191 extending from its front end and connected to the movable bracket 187. Pressurized air is supplied to the air cylinder 189 through flexible hoses 192 and 193 to impart movement to the piston rod 191 to slide the movable bracket 187 along the guide rods 184 and 186. A shaft 194 is slidably received in bearing openings extending through the brackets 182 and 183. One end of the shaft 194 extends past the bracket 183 toward the transfer unit 80. At the opposite end of the shaft 194, a spool 188 having a concave surface is secured. A roller 190 attached to an arm 195, pivotally connected to the bracket 187, is spring-biased against the curved surface of the spool 188 to provide a safety latch (similar to that shown in FIGS. 7, 8, and 9) for connecting the shaft 194 to the movable bracket 187.

Figure 18:
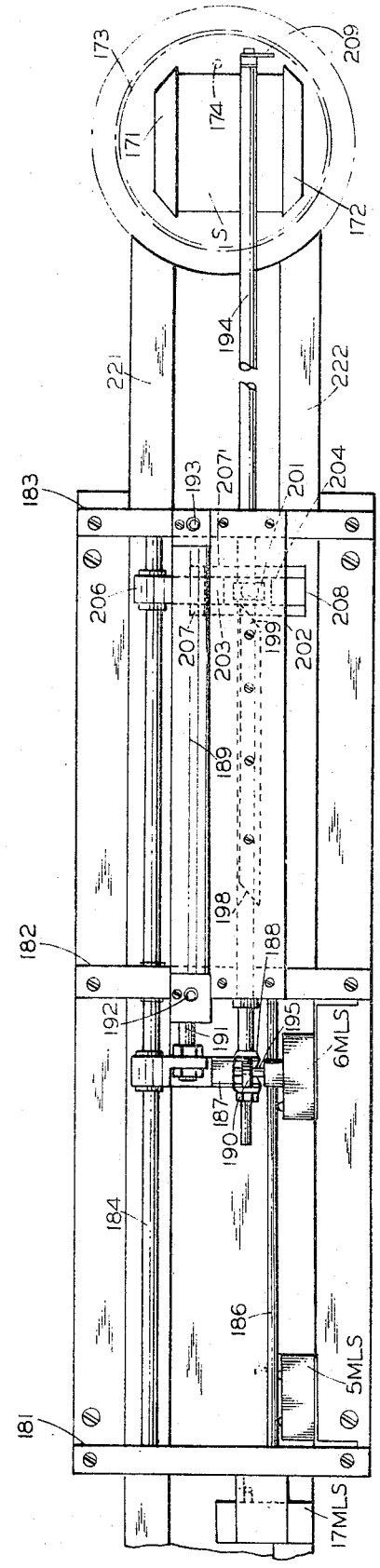
FIG. 18 is a side elevational view of the external transfer mechanism of FIG. 17 illustrating additional machine limit switches which are part of the control and interlock circuits.

A mounting plate 196 is secured to the brackets 182 and 183 and supports a camming member 197 adjacent to the shaft 194. The camming member 197 is in the form of a cylinder having parallel, inclined camming surfaces 198 and 199 machined at its opposite ends. A link 201 which is connected to the shaft 194 terminates in a cylindrical cam follower 202. The cam follower 202 moves over the surface of the camming member 197 when the air cylinder 189 is operated to move the shaft 194 relative to the brackets 182 and 183. A support member 206 is slidably received on the guide rod 184. Projecting downward from the support member 206 is a pair of side plates 207 and 207' (FIG. 18) which straddle the link 201. Each side plate has an opening therethrough for receiving the shaft 194. A block 208 is fastened to the lower ends of the side plates 207 and 207'.

A pair of curved springs 203 and 204, mounted to the support member 206 and the block 208, respectively, engage upper and lower surfaces of the link 201 such that in its normal position the link 201 projects horizontally from the shaft 194 toward the camming member 197. When the link 201 is located in this horizontal position, the cam follower 202 is located midway between the upper and lower surfaces of the camming member 197. Thus when the shaft 194 is moved to the left, from the position shown in FIG. 17, the cam follower 202 moves into engagement with the inclined surface 199, and as the shaft 194 continues its movement, the cam follower 202 is moved downward to rotate the link 201 and the shaft 194.

A feed finger 209 is secured to the extended end of the shaft 194 and projects at right angles therefrom. As shown in FIG. 17 when the shaft 194 is located in its extended position such that the cam follower 202 is located adjacent the inclined camming surface 199, the finger 209 is positioned beyond the right-hand edge of the substrate S held within the guide members 171 and 172 mounted on the front face of the transfer member 173. When the shaft 194 is moved leftward by the air cylinder 189, the cam follower engages the inclined camming surface 199 and is moved downward. This downward movement of the cam follower 202 pivots the link 201 and the shaft 194 in a clockwise direction to pivot the finger 209 into a horizontal position so that it can engage the right edge of the substrate S. As the movement of the shaft 194 continues, the cam follower 202 moves along the lower surface of the camming member 197 and the finger 209 engages the edge of the substrate and moves it to the external conveyor 40. When the piston rod 191 is moved to its fully extended position relative to the air cylinder 189, the cam follower 202 is moved off of the lower surface of the camming member 197 and the curved spring 204 biases the link 201 upward to move the cam follower 202 to a point midway between the upper and lower surfaces of the camming member 197. At this point, the finger 209 is turned in a downward direction by the shaft 194.

In removing substrates from the sputtering apparatus, the transfer unit 80 is first operated to move a substrate S from the cooling section 35 to a predetermined position outside the chamber section 35 adjacent to the external conveyor 40. Then the air cylinder 189 is operated by applying pressurized air to the flexible hose 192 to move the piston rod 191 into the air cylinder 189. This movement of the piston rod moves the shaft 194 toward the transfer unit 80. At the same time, the cam follower 202 moves into engagement with the inclined camming surface 198, and as the movement of the shaft 194 is continued, the cam follower 202 moves upward along the inclined surface 198 to rotate the link 201 and the shaft 194, against spring 203, in a counterclockwise direction. This rotation of the shaft 194 turns the finger 209 downward so that it avoids engaging and moves past the substrate S held in the front face of the transfer member 173. It should be noted that a groove 211 (FIGS. 15 and 17) is formed across the front face of the transfer member 173 to receive the shaft 194 when it is moved to its fully extended position. Continued movement of the piston rod 191 advances the shaft 194 through the groove 211 to move the finger 209 past the right-hand edge of the substrate S.

When the shaft 194 reaches its fully extended position (FIGS. 17 and 18), the cam follower 202 moves off of the upper surface of the camming member 197. The curved spring 203 then pivots the link 201 downward to position the cam follower 202 adjacent to the camming surface 199 and to pivot the finger 209 upward, toward the substrate S. When pressurized air is applied to the air cylinder 189 through the flexible hose 193, the cam follower 202 moves into engagement with the camming surface 199 and, as described above, the finger 209 moves into engagement with the right-hand edge of the substrate S. As the shaft 194 moves to the left, the substate S is pulled from the guide members 171 and 172 and is moved to the conveyor track of the external conveyor 40.

External conveyor

The external conveyor 40 (FIG. 3) is located outside the vacuum chamber 20 between the exit transfer unit 80 and the entrance transfer unit 60. The conveyor 40 includes a conveyor track 215 (FIGS. 7 and 19) along which substrates are advanced by an endless chain 216. The chain 216 is mounted on sprockets located at opposite ends of the conveyor track 215. A motor 213 (FIG. 3), connected through a brake-clutch unit 214 to one of the sprockets, advances the chain 216 intermittently. Spaced along the endless chain 216, at equal intervals, there are four projecting lugs 217 (FIG. 1A). The lugs 217 act as pushing elements for engaging the edges of the substates placed on the conveyor 40 and for moving them along the conveyor track 215.

The conveyor track 215 includes a plate 220 (FIGS. 7, 17, and 19) to which upper and lower guide rails 221 and 222, respectively, are connected. The plate 220 is secured to the side wall 19 of the chamber 20. The guide rails 221 and 222 have elongated slots 223 and 224 (FIG. 19), respectively, formed therein for receiving and guiding substrates which are advanced along the conveyor 40. The elongated 224 in the lower guide rail 222 is sufficiently wide to receive the endless chain 216. The slot 223 in the upper guide rail 221 is narrower than the corresponding slot 224 in the guide rail 222 and receives the upper edges of substrates advanced along the conveyor 40.

Figure 19:
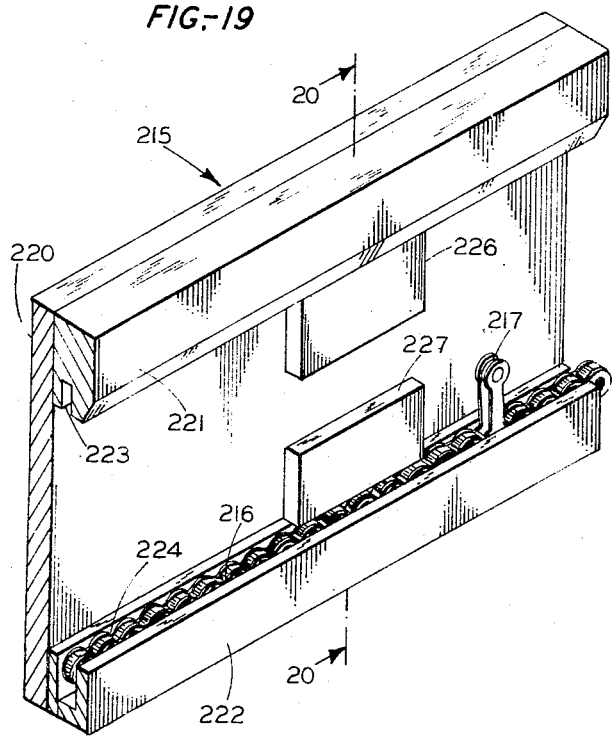
FIG. 19 is a perspective view of the external conveyor track showing a load and unload position at which processed substrates are removed and replaced by unprocessed substrates.
Figure 20:
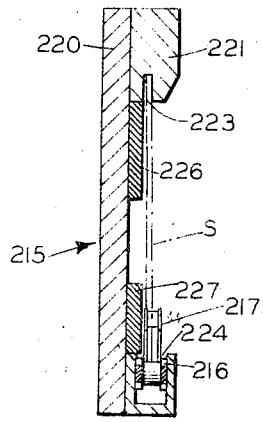
FIG. 20 is a sectional view, of the external conveyor track, taken along line 20—20 of FIG. 19.

At the center section of the conveyor 40, a space is provided for loading and unloading substrates. The hood 45 (FIG. 1) covers this space and provides a working area in which a machine operator may stand or be seated. As shown in FIGS. 19 and 20, a central portion of the track 215 is provided with an upper guide block 226 mounted to the plate 220. The guide block 226 abuts the upper guide rail 221, and its front surface is in alignment with the back edge of the slot 223. The track 215 is also provided with a lower guide block 227 secured to the plate 220 above the lower guide rail 221. The front surface of the block 227 is in alignment with the front surface of the guide block 226.

The guide blocks 226 and 227 facilitate the loading of substrates onto the conveyor 40. In placing a substate on the conveyor 40, the machine operator merely positions the upper edge of the substate against the front surface of the guide block 226 and slides the substrate edge upward into the groove 223. Then the lower portion of the substrate is moved into engagement with the front face of the guide block 227 to center its lower edge over the slot 224. Finally the substrate is released by the operator and it drops downward onto the chain 216.

Upon advancement of the chain 216, a lug 217 (FIG. 19) moves into contact with the substrate to advance it along the conveyor 40. The slots 223 and 224 guide the substrate in its movement along the conveyor 40 until it reaches the entrance end of the apparatus (FIG. 7).

Referring to FIG. 7, the lower guide rail 222 terminates at a distance from the entrance transfer unit 60 and a track section 229 is mounted on the plate 220 to form a receiving ledge which is an extension of the lower guide rail 222. The track section 229 is spaced from the guide rail 222 to provide a space for receiving a sprocket which supports the endless chain 216. The track section 229 has a funnel-shaped groove formed in its upper surface which guides a substrate, moving under the action of transfer mechanism 50, to the slotted members 81 and 82 on the transfer member 77.

Each time the chain 216 is advanced, a substrate is moved from the loading position (FIG. 19) to the track section 229 (FIG. 7). The lug 217, which advances the substrate, is moved downward through the space between the track section 229 and guide rail 222 and pushes the substrate onto the track section 229. Thus, the substrate is placed in a waiting position on the receiving ledge from which it is advanced by the transfer mechanism 50.

Referring to FIG. 17, the portion of the conveyor 40 adjacent to the exit unit 80 is shown. The lower guide rail 222 terminates at a distance from the exit unit 80 and a guide member 231 is secured to the plate 220 between the transfer unit 80 and the guide rail 222. The guide member 231 is spaced from the edge of the guide rail 222 to provide a space for receiving a sprocket on which the chain 216 is supported. A tapered slot (not shown), similar to the slot in the guide 127 of FIG. 11, is formed in the upper surface of the guide member 231 for receiving substrates which are moved from the transfer member 173 to the conveyor 40 by the transfer mechanism 90.

After the transfer mechanism 90 is operated to move a substrate onto the conveyor 40, the chain 216 is advanced. A lug 217 moves into contact with the substrate and advances it along the conveyor 40 to the center section, shown in FIG. 19. At this point, the operator manually removes the processed substrate and replaces it with an unprocessed one which then begins its movement into the sputtering apparatus upon the subsequent advance of the chain 216.

Interlock and control circuit

The operation of the sputtering apparatus is controlled by a cam-operated programmer 240, shown in FIG. 3. A drive shaft 241 for the programmer 240 is directly connected to the drive mechanism of the internal conveyor chain 216. As a result of this direct connection, the drive shaft 241 is rotated one revolution for each one-step advance of the continuously moving internal chain 216. The control circuit which is operated by the programmer 240 is shown schematically in FIGS. 21 and 22. The circuit includes a plurality of double-pole, double-throw switches having normally open contacts 1CS–12CS, inclusive, and normally closed contacts 1CS'–12CS', inclusive, These contacts are operated in sequence by cams mounted on the drive shaft 241. The circuit also includes machine limit switches 1MLS–21MLS, inclusive, mounted on the sputtering apparatus, and responsive to movement of various elements of the apparatus. The machine limit switches 1MLS–18MLS, 20MLS and 21MLS serve as safety switches which prevent the apparatus from operating when a malfunction in the sequence of operations has occurred.

Relays 2CR–16CR, inclusive, are controlled by the cam-operated switches and the machine limit switches. The relays 2CR–16CR operate solenoid valves V1–V4, which determine the atmosphere supplied to the interior of the air locks 60 and 80, and four-way solenoid valves V5–V12, inclusive. The valves V5 and V6 control the application of pressurized air to the air cylinders 66 and 177, respectively, which move the internal sealing devices of the air locks 60 and 80. Pressurized air is supplied to the rotary air cylinders 107 and 163 through the valves V7 and V8 to operate the internal transfer mechanisms 65 and 75. Valves V9 and V10 control the motion of the transfer members 77 and 173 of the entrance and exit air locks 60 and 80 by applying pressurized air to the air cylinders 87 and 176, respectively. Finally, the air cylinders 29 and 189 of the external transfer units 50 and 90 are controlled by the valves V11 and V12. The cam-operated programmer 240 operates the valves V1–V12 in a predetermined sequence to produce the desired sequential operation of the mechanisms of the sputtering apparatus.

Figure 21:
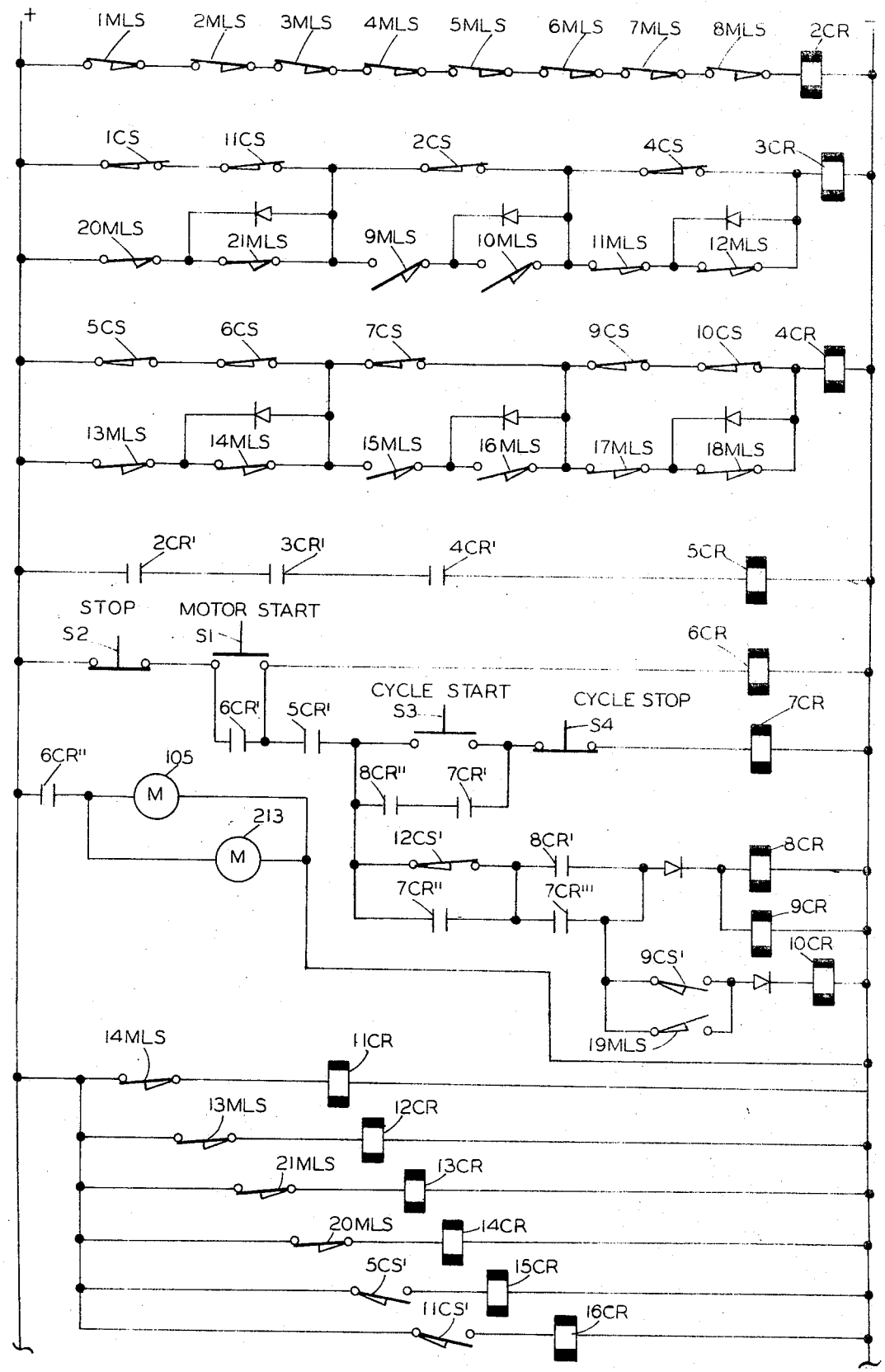
FIGS. 21 and 22 illustrate a control circuit for operating the sputtering machine of FIG. 1.

The interlock portion of the control circuit is shown in FIG. 21. The interlock or safety circuit includes relays 2CR–5CR, inclusive, The relay 5CR is connected to a source of potential through normally open contacts 2CR', 3CR', and 4CR' which are operated by the relays 2CR, 3CR, and 4CR, respectively. Normally open contacts 5CR', operated by the relay 5CR, are used to supply energy from the potential source to a cycle control circuit. Thus, when the relay 5CR is deenergized, the cycle control circuit is cut off from the energy source.

The relay 2CR is connected to a potential source through a bank of normally closed switches, 1MLS–8MLS, arranged in series. Each of the switches is operated only when one of the transfer mechanisms or conveyors is jammed. For example, the switches 1MLS and 2MLS (FIG. 8) are mounted on the plate 28 of the external entrance transfer mechanism 50. The switches 1MLS and 2MLS are arranged such that each can be operated by the pivot arm 42 only when the arm 42 is located in its pivoted position. This means that either switch 1MLS or 2MLS is only operated (opened) when the transfer mechanism 50 has encountered an obstruction. If no obstruction is encountered, the switches 1MLS and 2MLS remain closed, and the relay 2CR is maintained in its energized state.

The normally closed limit switch 3MLS (FIG. 3) is opened when the external conveyor 70 is overloaded. The chain 216 of the external conveyor 40 is driven by the motor 213 through a mechanical overload clutch 214' (FIG. 3). When the chain 216 encounters an obstruction or is prevented from moving, the clutch 214' responds to the overload condition by opening the switch 3MLS. Upon opening of the switch 3MLS, the relay 2CR is deenergized to open contacts 2CR' and deactivate relay 5CR. When the relay 5CR is deactivated, the contacts 5CR' are opened to disconnect the cycle control circuit from the energy source.

In similar fashion, the chain 111 of the internal conveyor 70 is driven by the motor 105 through an over-overload clutch 109'. The clutch 109' cooperates with the normally closed switch 7MLS to deenergize the cycle control circuit if the internal conveyor chain 11 becomes obstructed.

The limit switch 4MLS (FIG. 10) is opened by a mechanical overload clutch 107' when it senses an overload on the shaft 106 of the internal entrance transfer menchanism 65 to deenergize relay 2CR when the transfer arm 98 encounters an obstruction. Similarly, the switch 8MLS (FIG. 15) is operated by an overload clutch 163' when the internal exit transfer mechanism 75 is obstructed.

The external exit transfer mechanism 90 (FIG. 18) is provided with limit switches 5MLS and 6 MLS. The operation of these switches 5MLS and 6MLS is similar to that of the limit switches 1MLS and 2MLS since the switches 5MLS and 6MLS can only be operated when the arm 195 is in its pivoted position. Thus, the normally closed switches 5MLS and 6MLS are only opened when the transfer mechanism 90 has encountered an obstruction.

Referring to FIG. 21, it is obvious that the relay 2CR remains in its energized state only as long as all the switches 1MLS–8MLS, inclusive, are closed. Since each of the switches is responsive to an overload or obstruction in the apparatus, the relay 2CR is continuously energized when the apparatus is functioning properly. In summary, upon the occurrence of any malfunction, however, one of the switches 1MLS–8MLS is opened and the relay 2CR is immediately deenergized to stop the operation of the sputtering apparatus.

Relay 3CR is connected to the potential source through a network including cam-operated contacts 1CS, 2CS, 4CS, and 11CS and machine limit switches 9MLS–12MLS, 20MLS and 21MLS. One branch of the network includes contacts 1CS, 11CS, 2CS, and 4CS connected in series to one terminal of the relay 3CR. The limit switches 9MLS–12MLS, 20MLS and 21MLS are arranged in a second branch of the network, in parallel with the branch containing the cam-operated switches.

The cam-operated contacts 1CS, 2CS, 4CS, and 11CS are opened at predetermined time intervals by the programmer 240. If the relay 3CR were only connected to the potential source through these switches, then the relay 3CR would be deenergized each time one of the switches is opened. But, as shown in FIG. 21, the contacts 1CS and 11CS are shunted by the limit switches 20MLS and 21MLS. Similarly, the contact 2CS is shunted by the switches 9MLS and 10MLS, and the contact 4CS is shunted by the switches 11MLS and 12MLS. Thus, although one of the cam-operated contacts (e.g., contact 2CS) is opened, the relay 3CR can remain energized if the shunting switches (e.g., switches 9MLS and 10MLS) are closed. The contact 2CS, for example, is opened when the programmer 240 directs the control circuit to operate the internal entrance and exit transfer mechanisms 65 and 75 by closing the contact 2CS'. The normally open switches 9MLS (FIG. 4) and 10MLS are closed when the internal sealing caps 63 and 180 are retracted from the barrels 61 and 170. As a result, upon the opening of contact 2CS, the relay 3CR can only remain energized if the sealing caps are in the retracted positions to operate the switches 9MLS and 10MLS. If either sealing cap is not opened, then the relay 3CR is deenergized when the contact 2CS is opened. If the relay 3CR is deenergized, then the contacts 3CR' are opened and the relay 5CR is turned off thereby opening contacts 5CR' to deenergize the cycle control circuit. In this fashion the transfer mechanisms 65 and 75 are prevented from operating when the sealing caps 63 and 180 are not in the retracted positions.

The limit switches 11MLS (FIG. 15) and 12MLS (FIG. 10) are operated by the rotary air cylinders 163 and 107 of the internal exit and entrance mechanisms 75 and 65, respectively. The switches 11MLS and 12MLS are closed when the transfer arms 98 and 136 are located in their retracted positions (FIGS. 10 and 15). The contact 4CS is opened when the programmer 240 operates the control circuit to close the air locks 60 and 80 by moving the sealing caps into engagement with the barrels 61 and 170. Consequently, the switches 11MLS and 12MLS together with the cam-operated contact 4CS serve as a safety, interlock circuit for preventing the sealing caps 63 and 180 from moving toward the barrels 61 and 170 when either transfer arm 98 or 136 is in its forward, extended position.

The switches 20MLS and 21MLS are closed when the transfer members 77 and 173 are positioned inside the barrels 61 and 170 to seal the barrel interiors from the ambient atmosphere. Cam-operated switch 1CS is opened when the control circuit is told to unseal the air locks 60 and 80 by moving the sealing caps 63 and 180 away from the projecting ends of the barrels 61 and 170. The circuit arrangement prevents the sealing caps 63 and 180 from moving if the opposite ends of the barrels 61 and 170 are not sealed by the transfer members 77 and 173. This insures that the interior of the chamber 20 is always sealed from the ambient atmosphere.

The cam-operated contact 11CS is opened when the programmer 240 directs the control circuit to open valves V3 and V4 through which vacuum sources are connected to the interiors of the air locks 60 and 80. The contact 11CS and the switches 20MLS and 21MLS prevent valves V3 and V4 from being opened when the air locks 60 and 80 are not sealed by the transfer members 77 and 173, respectively.

In similar fashion, the relay 4CR is connected to the potential source through a network including cam-operated contacts 5CS–7CS, 9CS and 10CS which are arranged in series. A parallel branch of the network includes normally open limit switches 13MLS–18MLS, inclusive. The switches 13MLS and 14MLS (FIG. 4), operated when the sealing caps 180 and 63 are closed, shunt the cam-operated contacts 5CS and 6CS. Contact 7CS is shunted by the switches 15MLS and 16MLS (FIG. 4) which are closed when the transfer members 77 and 173 are located outside the barrels 61 and 170. The contacts 9CS and 10CS are shunted by the limit switches 17MLS (FIG. 18) and 18MLS (FIG. 8), operated when the shafts 36 and 194 of the external transfer mechanisms 50 and 90 are retracted.

The contact 5CS is opened at the same time that contact 5CS' is closed to operate the vent valves V1 and V2. If both sealing caps 63 and 180 are closed, the switches 13MLS and 14MLS are closed and the operation of the apparatus is not interrupted. If either switch 13MLS or 14MLS is open, however, the operation is halted instantaneously. Thus, the vent valves V1 and V2 cannot be opened if one of the sealing caps 63 and 180 is out of engagement with the barrels 61 and 170.

The contact 7CS is operated simultaneously with contact 7CS' to move the shafts 36 and 194 of the external transfer mechanisms 50 and 90 to their extended positions. The limit switches 15MLS and 16MLS prevent the shafts from moving if either of the transfer members 73 and 177 is not located outside the chamber 20.

The contact 9CS is opened when the programmer 240 operates the control circuit to advance the external conveyor chain 216. The limit switches 17MLS and 18MLS prevent the chain 216 from advancing if either shaft 36 or 194 is not in its completely retracted position. Finally, the contact 10CS is opened at the same time as the closure of contact 10CS' occurs to advance the transfer members 73 and 177 into the barrels 61 and 170. The switches 17MLS and 18MLS again prevent the transfer members 73 and 177 from moving if either of the transfer mechanisms 50 and 90 is not in its completely retracted position.

From the above description of the interlock circuit it is obvious that the sputtering apparatus is not permitted to deviate from its predetermined operating cycle. The arrangement of cam-operated contacts and machine limit switches restricts the machine operation to a predetermined sequence. If the sputtering apparatus deviates, in any way, from this predetermined sequence, the control circuit is immediately broken by opening contacts 5CR' to terminate the machine operation.

Detailed operation of sputtering apparatus

The control circuit (FIGS. 21 and 22) for the sputtering apparatus of the present invention is designed such that when the apparatus is in its starting position and ready to begin an operating cycle, the air locks 60 and 80 are sealed from both sides. In this position, the transfer member 73 of the air lock 80 is located within the barrel 61 with the flange 83 in sealing engagement with the external end of the barrel 61 and resilient ring 84, and the sealing cap 63 is in sealing engagement with the opposite end of the barrel 61 (FIG. 6). At the same time, the transfer unit or air lock 80 is in a similar state.

To initiate the operation of the sputtering apparatus, a motor start switch S1 (FIG. 21) is temporarily closed to energize relay 6CR thereby closing the normally open contacts 6CR' and 6CR''. The closure of contacts 6CR' locks the relay 6CR in its energized condition as long as a stop switch S2 remains closed. When contacts 6CR'' are closed, the motors 105 and 213 (FIGS. 3 and 21) are actuated and run continuously as long as the relay 6CR is energized. It is evident from FIG. 21 that once the motors 105 and 213 are operated, they can only be stopped by depressing the normally closed stop switch S2.

Next, the machine operator places a first substrate S on the external conveyor 40 at the central loading position (FIG. 19). Then a cycle start switch S3 is closed to energize the relay 7CR and begin the advance of the substrate S into the sputtering apparatus. The energized relay 7CR closes its normally open contacts 7CR', 7CR'', and 7CR'''. Relays 8CR and 9CR are thereby energized through the closed contacts 7CR'' and 7CR'''. The relay 8CR closes its associated contacts 8CR', 8CR'', and 8CR'''. Upon the closure of normally open contacts 8CR', the relay 8CR is locked into an energized condition through the normally closed, cam-operated contact 12CS' and the closed contact 7CR''. The relay 7CR is also locked in an energized state through the closed contacts 7CR' and 8CR''. The operated relay 9CR opens normally closed contacts 9CR' and closes normally open contacts 9CR''. The opening of contact 9CR' deenergizes a brake winding 109B of the clutch-brake unit 109 and the closure of contacts 9CR'' energizes a clutch winding 109C to connect the motor 105 to the driving means for the internal conveyor chain 111 and the drive shaft 241 of the cam-operated programmer 240. It should be noted that the chain 111 and the programmer 240 are continuously operated by the motor 105 as long as the relay 9CR remains in an energized state.

Figures 21, 22, 23:
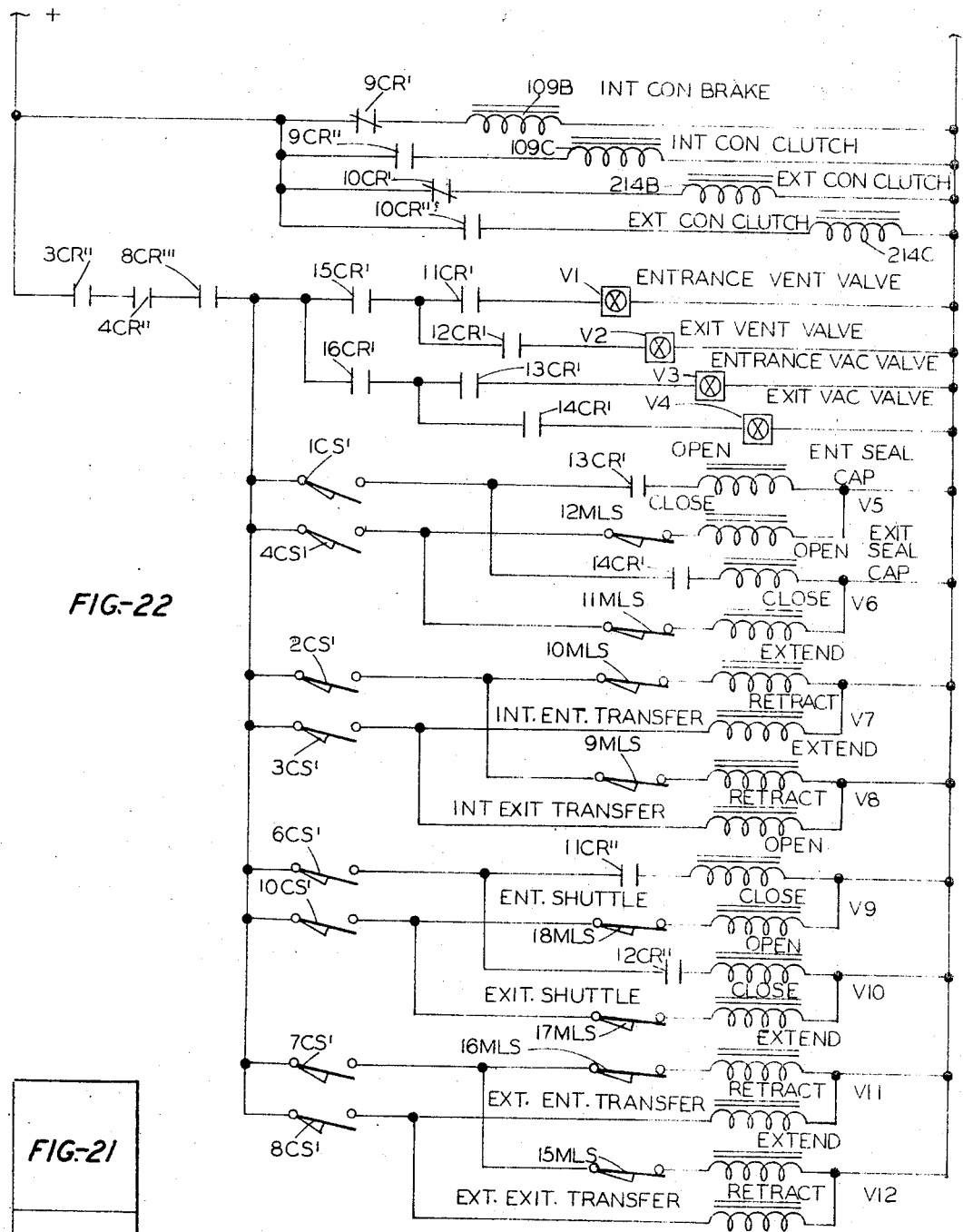
FIG. 23 shows the interconnection of FIGS. 21 and 22 to provide the control circuit for the present invention.

As the drive shaft 241 is rotated, the cam operated switches 1CS–12CS are operated in sequence to control the functions of the sputtering apparatus. Each cam-operated switch is a double-pole, double-throw type having a first set of normally open contacts and a second set of normally closed contacts. As shown in FIGS. 21 and 22, the normally closed contacts, 1CS, 2CS, 4CS–7CS and 9CS–11CS form part of the interlock or safety circuit. The normally opened contacts 1CS'–12CS' are part of the operating circuit of the sputtering apparatus.

When the normally open contact 1CS' is closed, the four-way solenoid valves V5 and V6 are energized through the now closed contacts 13CR' and 14CR', respectively, to apply pressurized air to the air cylinders 66 and 177 such that the internal sealing caps 63 and 180 of the transfer units 60 and 80 are moved to their open positions, away from the corresponding barrels 61 and 170. Thus, the front ends of the transfer members 77 and 173 are exposed to the atmosphere within the chamber 20. Next, the normally open contact 2CS' is closed to energize the four-way valves V7 and V8, through the switches 10MLS and 9MLS, respectively, to operate the rotary air cylinders 107 and 163 (FIGS. 10 and 15). The air cylinder 107 drives the transfer arm 98 and feed finger 99 of the transfer mechanism 65 across the front face of the transfer member 77. If a substrate is held between the guide members 81 and 82, it is engaged by the feed finger 99 and moved through the guide 127 to the internal conveyor 70. The air cylinder 163 moves the arm 136 and feed finger 141 of the transfer mechanism 75 toward the exit transfer member 173. If another substrate has reached the end of the conveyor 70, it is engaged by the feed finger 141 and moved between the guide members 171 and 172 of the transfer member 173. Upon closure of the normally open contact 3CS', the valves V7 and V8 are operated to reverse the rotary air cylinders 107 and 163 to return the transfer mechanisms 65 and 75 to their initial positions (FIGS. 10 and 15).

After the transfer arms 98 and 136 are retracted, the contact 4CS' is closed to energize the solenoid valves V7 and V8 thereby reversing the air cylinders 66 and 177. The internal sealing caps are thus moved back into engagement with the barrels 61 and 170.

Next, the normally open contact 5CS' is closed to energize the relay 15CR. The energized relay 15CR closes normally open contacts 15CR' to apply an operating potential to the entrance and exit vent valves V1 and V2 through the contacts 11CR' and 12CR', respectively. The contacts 11CR' and 12CR' are held closed by relays 11CR and 12CR which are energized through limit switches 14MLS and 13MLS, respectively. Since the switches 13MLS and 14MLS are closed only when the sealing caps 63 and 180 engage the barrels 61 and 170, the valves V1 and V2 can only be operated if the internal sealing devices of the air locks 60 and 80 are closed. When the valves V1 and V2 are opened, a portion of the ambient atmosphere is allowed to enter the interiors of the transfer units 60 and 80 to increase the pressure therein.

After the ambient atmosphere has entered the transfer unit interiors, the cam-operated contact 6CS' is closed to energize valves V9 and V10 through the normally open contacts 11CR'' and 12CR'' which are closed when relays 11CR and 12CR are energized. As described above, the relays 11CR and 12CR are energized only when the sealing caps 63 and 180 are in engagement with the barrels 61 and 170. Pressurized air is applied through the valves V9 and V10 to the air cylinders 87 and 176 to move the transfer members 77 and 173 out of the corresponding barrels 61 and 170 into the ambient atmosphere. By virtue of the relays 11CR and 12CR and associated contacts 11CR'' and 12CR'', the transfer members 77 and 173 cannot be moved unless the sealing caps 63 and 180 are closed.

Next, the external transfer mechanisms 50 and 90 are actuated by the closure of contact 7CS' thereby energizing the solenoid valves V11 and V12 through the switches 15MLS and 16MLS which are closed when the sealing caps 63 and 180 are moved away from the projecting ends of the barrels 61 and 170. Pressurized air is directed through the valves V11 and V12 to the air cylinders 29 and 189 to move the shafts 36 and 194 to their extended positions. As the shaft 36 of the external entrance transfer mechanism 50 moves to its extended position, the feed finger 52 moves toward the transfer unit 60 to engage and advance a substrate from the ledge 229 of conveyor 40 to the transfer unit 60. When the cam-operated contact 8CS' is closed, the valves V11 and V12 are reversed and the shafts 36 and 194 are returned to their initial positions. Upon the return movement of shaft 194, the finger 209 engages a substrate held on the front face of the transfer member 173 and moves it to the external conveyor 40.

At this point the contact 9CS' is momentarily closed to energize the relay 10CR. It should be noted that when the chain 216 is stopped, a normally closed switch 19MLS (FIGS. 1A and 21) is held in an open position by a lug 217. The energized relay 10CR opens normally closed contacts 10CR' and closes normally open contacts 10CR''. The opening of contacts 10CR' deenergizes brake windings 214B of clutch-brake unit 214 and the closure of contacts 10CR'' energizes the clutch windings 214C to connect the continuously running motor 213 to the external chain 216. The switch 19MLS is closed upon the initial movement of the chain 216. The endless chain 216 advances by ¼ of its length until the normally closed switch 19MLS is opened by another lug 217 to deenergize the relay 10CR. Then the contacts 10CR'' open and the contacts 10CR' close to operate the braking mechanism of the clutch-brake unit 214 to stop the advance of the chain 216. The resulting intermittent movement of the chain 216 advances the first substrate S from the loading position at the center of the conveyor to the receiving ledge 229 (FIG. 7) adjacent the entrance transfer unit 60. At the same time, the chain 216 moves a processed substrate from the exit end of the apparatus to the center of the conveyor 40. When the movement of the chain 216 stops, the processed substrate is removed manually by the machine operator and is replaced by another, unprocessed substrate.

The cam-operated contact 10CS' is next to close. When it closes, the valves V9 and V10 are operated through limit switches 18MLS (FIG. 8) and 17MLS (FIG. 18) to apply pressurized air to the air cylinders 87 and 176 such that the transfer members 77 and 173 are moved into the barrels 61 and 170, respectively. If either switch 17MLS or 18MLS is open, i.e., if either transfer mechanism 90 or 50 is not fully retracted, then the corresponding transfer member cannot be moved. After the barrels have been sealed by the flanges projecting from the transfer members 77 and 173, the contact 11CS' is closed to energize the relay 16CR. The energized relay 16CR closes the contact 16CR' to actuate the solenoid valves V3 and V4 through the contacts 13CR' and 14CR'. The contacts 13CR' and 14CR' are operated by relays 13CR and 14CR which are energized only when switches 21MLS and 20MLS are closed, i.e., when the transfer members 73 and 177 are inside the air locks 60 and 80. The valves V3 and V4 are thus opened to connect the interiors of the transfer units 60 and 80 to vacuum sources, and the pressure within the transfer units 60 and 80 is reduced to a value which is substantially the same as the pressure maintained within the chamber sections 25 and 35.

The cam-operated contact 12CS' serves as a cycle stop switch. The programmer 240 opens the contact 12CS' every time the drive shaft 241 completes one revolution. Normally, the repeated opening and closing of this contact 12CS' does not affect the operation of the control circuit since it is shunted by contacts 7CR'' held closed by the relay 7CR which remains energized unless cycle stop switch S4 is depressed.

As shown in FIG. 21, the machine operator may depress either motor stop switch S2 or cycle stop switch S4 to terminate the operation of the sputtering apparatus. If the switch S2 is used, the motors 105 and 213 are stopped instantaneously and the apparatus is brought to a dead stop. If the cycle stop switch S4 is depressed, however, the apparatus is stopped only when an operating cycle is completed. When switch S4 is depressed, the circuit containing relay 7CR is broken and the relay 7CR is deenergized. As a result, the contacts 7CR', 7CR'', and 7CR''' are returned to their normally open condition. The sputtering apparatus is not stopped immediately since the relay 8CR remains energized through the contacts 8CR' and the cam-operated contact 12CS'. When the apparatus completes one cycle of operation, the contact 12CS' is opened thereby deenergizing relays 8CR and 9CR to stop the apparatus at the end of the cycle.

If neither the motor stop switch S2 nor the cycle switch S4 is operated, the sputtering apparatus operates continuously and the above-described operating cycle is repeated. Under normal operating conditions, the machine operator merely removes a processed substrate from the center portion of the conveyor 40 and replaces it with an unprocessed substrate.

The continuous processing of substrates through the sputtering apparatus of the present invention, without disturbing the controlled atmosphere within the sputtering section of the apparatus, insures that uniform, thin-film layers of sputtered material are applied to the substrates. Since no work carriers are used to transport the substrates through the apparatus, impurities cannot enter the sputtering chamber via workholders which are repeatedly exposed to the ambient atmosphere. Because the sputtering apparatus is completely sealed from the ambient atmosphere, it is not necessary to provide additional facilities for removing impurities from the atmosphere surrounding the apparatus. Finally, the transfer units and air locks of the present invention are designed to minimize the amount of ambient atmosphere which enters the sputtering chamber when substrates are transferred to and from the interior of the chamber.

The above-described embodiment is merely illustrative of the principles of the present invention, and modifications in the apparatus may be made by persons skilled in the art without departing from the scope of the present invention.

What is claimed is:

1. In an apparatus for moving articles through a chamber containing a controlled atmosphere;
    first means movable into and out of said chamber for receiving and transferring articles into said chamber;
    second means movable into and out of said chamber for receiving and transferring articles from said chamber;
    means for cyclically operating said first and second transferring means;
    means within the chamber for moving articles from said first transferring means to said second transferring means;
    means cooperating with said first and second transferring means and rendered effective by movement of said first and second transferring means into said chamber for enclosing and sealing articles received on said first and second transferring means from the ambient atmosphere; and
    means rendered effective upon the operation of said enclosing and sealing means for applying the controlled atmosphere to articles received on said first transferring means and for applying the ambient atmosphere to articles received on said second transferring means.

2. In an apparatus for processing articles in a controlled atmosphere:
    a chamber for confining a controlled atmosphere therein, said chamber provided with entrance and exit openings;

first and second internal sealing means movably mounted within said chamber for covering said entrance and exit openings, respectively, to prevent the ambient atmosphere from entering said chamber, each of said sealing means provided with an article receiving space in registration with the corresponding opening;

first and second transfer members mounted for movement into said chamber through said entrance and exit openings, respectively, each of said transfer members provided with means for receiving and holding articles;

means for simultaneously advancing said first and second transfer members through said entrance and exit openings, respectively, into said article receiving spaces;

external sealing means carried by both said transfer members and rendered effective upon advancement of said transfer members for covering said entrance and exit openings to seal said article receiving spaces from the ambient atmosphere;

means for moving said first and second internal sealing means away from said entrance and exit openings whereupon said chamber is sealed from the ambient atmosphere by said external sealing means; and conveying means rendered operative upon the movement of said internal sealing means for advancing articles from said first transfer through the controlled atmosphere in said chamber to said second transfer member.

3. An apparatus for processing articles in a controlled atmosphere, as set forth in claim 2, including:

means rendered effective upon the covering of said entrance and exit openings by said external sealing means for conforming the atmosphere within the sealed article receiving spaces to the controlled atmosphere within said chamber.

4. In an apparatus for transporting articles through a chamber having a controlled atmosphere maintained therein:

hollow entrance and exit cylinders extending into the chamber;

first sealing means movably mounted for sealing the end of said hollow entrance cylinder located within the chamber;

a first transfer member mounted for movement into said entrance cylinder and provided with means for receiving and supporting an article;

second sealing means movably mounted for sealing the end of said hollow exit cylinder located within the chamber;

a second transfer member mounted for movement into said exit cylinder and provided with means for receiving and supporting an article;

means for simultaneously advancing said first and second transfer members into said entrance and exit cylinders, respectively;

means carried by both said transfer members and rendered effective upon complete advancement of said transfer members for sealing the other ends of both said cylinders;

means for moving said first and second sealing means away from the ends of said cylinders located within the chamber; and means rendered effective upon movement of said sealing means from said cylinders for transporting articles from said first transfer member, through said chamber to said second transfer member.

5. In an apparatus for continuously transferring articles to and from a conveyor means, located within a chamber having a controlled atmosphere maintained therein, through entrance and exit openings formed at spaced sections of the chamber:

first and second air locks located in said entrance and exit ports, respectively, each air lock including (1) internal sealing means movably mounted within said chamber and normally covering its corresponding port to seal said chamber from the ambient atmosphere, said sealing means having an article receiving space formed therein and in registration with said port, and (2) a movable transfer member normally located outside the chamber having article holding means and a flange projecting therefrom, spaced from and overlying said port;

means for placing an article on the holding means of the entrance transfer member;

means for simultaneously moving both transfer members through the entrance and exit ports, respectively, into the article receiving spaces formed by said internal sealing means such that the flanges thereon cover the respective ports to seal the article receiving spaces from said ambient atmosphere;

means for applying a first predetermined atmosphere to the sealed article receiving spaces;

means for moving said internal sealing means away from the entrance and exit ports to expose said transfer members and the first article to the controlled atmosphere within said chamber;

a first feed mechanism located within said chamber adjacent said entrance port for moving the first article from the entrance transfer member to the conveyor means;

a second feed mechanism located within said chamber adjacent said exit port for moving a second article from said conveyor means to the holding means on the exit transfer member;

means for simultaneously closing said internal sealing means to seal the article receiving spaces from said controlled atmosphere;

means for applying a second predetermined atmosphere to said sealed article receiving spaces; and means for moving said transfer members to their initial positions outside said chamber.

6. In an apparatus for continuously advancing articles to and from a conveyor means located within a chamber having a controlled vacuum maintained therein, through openings at entrance and exit ends of the chamber:

first and second air locks located at the entrance and exit ends of the chamber, respectively, each air lock including (1) a barrel mounted in the opening, one end thereof projecting into the chamber, (2) a movable cap located within the chamber and normally engaging the end of said barrel to seal the chamber from the ambient atmosphere, and (3) a transfer member normally located outside the chamber having article holding means on its front face and a flange projecting from its side, spaced from and overlying said opening;

means for placing a first article on the holding means of the entrance transfer member;

means for simultaneously moving both transfer members into the barrels such that the flanges thereon cover the opposite ends thereof to seal the interiors of the barrels from the ambient atmosphere;

means for applying a partial vacuum to the interiors of the barrels to conform the atmosphere therein to the controlled vacuum within the chamber;

means for moving the caps away from the projecting ends of said barrels to expose the transfer members and the first article to the vacuum within the chamber;

transfer devices located within the chamber of the entrance and exit ends thereof for moving the first article from said entrance transfer member to the conveyor and for moving a second article from the conveyor to the exit transfer member;

means rendered effective upon the operation of said transfer device for moving said caps into engagement with the projecting ends of said barrel to seal the interiors of said barrels from the controlled vacuum within the chamber;

means for admitting the ambient atmosphere to the interior of said barrels; and means for returning said transfer members to their initial positions to withdraw the second article from the chamber.

7. In an apparatus for continuously moving substrates through a sputtering chamber, isolated from the ambient atmosphere, having a controlled atmosphere maintained therein and facilities for depositing metallic coatings on the substrates:

a first conveyor means located within the chamber for transporting substrates from an entrance end past the metal depositing facilities to an exit end of the chamber;

a second conveyor means located outside and adjacent to the chamber for transporting substrates therealong in a direction opposite to the movement of said first conveyor;

first and second air locks located in openings at the entrance and exit ends, respectively, of the chamber, each air lock including (1) internal sealing means movably mounted within said chamber and normally covering said opening to seal said chamber from the ambient atmosphere and (2) a movable transfer member normally located outside the chamber having substrate holding means and a flange projecting therefrom, spaced from and overlying said opening;

means located adjacent said entrance end of said chamber for moving a first substrate from said second conveyor means to the holding means on the entrance transfer member;

means for simultaneously moving both transfer members into their respective air locks such that the flanges thereon cover the respective openings to seal the interior of said air locks from the ambient atmosphere;

means for applying a first predetermined atmosphere to the sealed interiors of said air locks;

means for moving said internal sealing means away from said openings to expose said transfer members and the first substrate to the controlled atmosphere within said chamber;

means located within said chamber at said entrance end for moving the first substrate from the entrance transfer member to said first conveyor means;

means located within said chamber at said exit end for moving a second substrate from said first conveyor means to the exit transfer member;

means for simultaneously closing said internal sealing means to seal the interior of said air locks from said controlled atmosphere;

means for applying a second predetermined atmosphere to the interiors of said air locks;

means for moving said transfer member to their initial positions outside said chamber; and means for moving the second substrate from said exit transfer member to said second conveyor means.

8. In a device for transporting an article between the ambient atmosphere and a chamber having a controlled atmosphere maintained therein through an opening in a wall of the chamber, while preventing the ambient atmosphere from entering the chamber;

a hollow cylinder mounted in the chamber opening, one end thereof projecting into the chamber;

a transfer member mounted for movement into said hollower cylinder, said transfer member having a flange for engaging the other end of the cylinder to seal its interior from the ambient atmosphere and also having article receiving and holding means which extend into the chamber past the projecting end of said hollow cylinder when said flange engages said cylinder; and a sealing cap movably mounted within said chamber, said cap having an opening formed therein in registration with the hollow interior of said cylinder to provide a receiving space for receiving the extended end of said transfer member and said article holding means, said cap also having a rim surrounding said opening for engaging the projecting end of said cylinder to seal the interior thereof from the controlled atmosphere in the chamber.

9. In an air lock for moving an article through an opening in a wall separating first and second regions containing dissimilar atmospheres:

first sealing means movably mounted in the first region and normally covering the opening to seal the first region from the atmosphere in the second region, said sealing means having an article receiving space formed therein in registration with the opening;

a transfer member movably mounted in the second region having article receiving means on its front end and also having second sealing means projecting therefrom, spaced from and overlying the openings;

means for moving said transfer member through the opening into said article receiving space to move said second sealing means over said opening to seal the article receiving space from the atmosphere in said second region; and means for moving said first sealing means away from said opening to expose the transfer member to the atmosphere in said first region.

10. In an air lock, as set forth in claim 9, means rendered effective upon both said first and second sealing means being positioned to seal said article receiving space for supplying a predetermined atmosphere to the sealed article receiving space.

11. In an apparatus for transporting an article from a region containing a first atmosphere to a region containing a second atmosphere;

a hollow cylinder extending between the regions containing said first and second atmospheres;

an article transfer device mounted for movement from the region of said first atmosphere into and out of said hollow cylinder;

means for cyclically moving said article transfer means into and out of said hollow cylinder;

first means rendered effective prior to movement of said transfer device into said cylinder for sealing the end of said cylinder in the region of said second atmosphere; and second means rendered effective by the movement of said article transfer device into said cylinder for sealing the other end of said cylinder from said first atmosphere.

12. In an apparatus for transporting an article from a region containing a first atmosphere to a region containing a second atmosphere, as defined in claim 11, means operated prior to movement of said article transfer device into said hollow cylinder for advancing an article to said article transfer device.

13. In an apparatus for transporting an article from a region containing a first atmosphere to a region containing a second atmosphere, as defined in claim 11, means rendered effective upon the sealing of said cylinder by said second sealing means for removing said first sealing means from the end of said hollow cylinder; and means operated upon the advance of said article transfer device into said cylinder and the removal of said first sealing means from said cylinder for advancing an article to said article transfer device.

14. In an apparatus for transporting an article from a region containing a first atmosphere to a region containing a second atmosphere, as defined in claim 11, wherein, said first sealing means comprises a movable cap normally engaging the end of said hollow cylinder to seal the interior of said cylinder from said second atmosphere; and said second sealing means is mounted on said transfer device and is moved into engagement with the other end of said hollow cylinder upon movement of said transfer device into said cylinder to seal the interior of said cylinder from said first atmosphere.

15. In an apparatus for transporting an article from a region containing a first atmosphere to a region containing a second atmosphere, as defined in claim 11:
means rendered effective upon the operation of said first and second sealing means for supplying a predetermined atmosphere to the sealed interior of said hollow cylinder.

16. In a device for inserting an article into a sealed chamber through an opening in a wall forming part of the chamber:
first sealing means movably mounted within said chamber and covering said opening to seal the chamber from the ambient atmosphere, said sealing means having a cavity formed therein and in registration with said opening for receiving an article;
transfer means for moving an article through said opening to position said article within said cavity;
second sealing means on said transfer means and rendered effective upon movement of said transfer means for covering said opening to seal said cavity from the ambient atmosphere; and
means rendered effective upon the second sealing means covering said opening for moving said first sealing means away from said wall to expose said article to the atmosphere in said chamber.

17. In a device for inserting an article into a sealed chamber through an opening in a wall forming part of the chamber, as set forth in claim 16:
means rendered effective upon the sealing of said cavity from the ambient atmosphere for replacing the atmosphere sealed within the cavity with a predetermined atmosphere prior to the movement of said first sealing means away from said wall.

18. In an apparatus for inserting an article into a chamber containing a controlled atmosphere, through an opening in said chamber:
a sealing device including a barrel mounted within said opening, one end thereof projecting into said chamber, and a movable sealing cap normally engaging the end of said barrel to seal the chamber from the ambient atmosphere;
means for moving an article through said opening into said barrel;
means for sealing the opposite end of said barrel to isolate the article and the atmosphere within said barrel from the ambient atmosphere;
means for supplying a predetermined atmosphere to the sealed interior of said barrel; and
means for moving said sealing cap away from said barrel to expose the article to the controlled atmosphere within said chamber.

19. In a device for inserting an article into a sealed, vacuum chamber through an opening in a wall forming part of the chamber:
a hollow cylinder mounted in the opening in said chamber, one end thereof projecting into said chamber;
internal sealing means movably mounted within the chamber normally engaging the projecting end of said hollow cylinder to seal said chamber from the ambient atmosphere;
a transfer member mounted for movement into said hollow cylinder and having a front end provided with means for receiving and holding an article;
means for advancing said transfer member into said hollow cylinder to position the article within the chamber;
external sealing means mounted to said transfer member and rendered effective upon advancement of said transfer member into said hollow cylinder for sealing the other open end of said hollow cylinder;
means for evacuating the sealed hollow cylinder; and
means for moving said internal sealing means away from said opening to expose the article to the vacuum within the chamber.

20. A device for inserting an article into a sealed, vacuum chamber, as set forth in claim 19, wherein:
said external sealing means comprises a flange mounted on said transfer member for covering the open end of said hollow cylinder upon advancement of said transfer member into said cylinder.

21. In an apparatus for feeding articles into a chamber:
a transfer member mounted for movement from a first position outside the chamber to a second position within the chamber;
a conveyor for advancing articles along a fixed path of movement to a feed position adjacent to the first position of said transfer member;
a guide member mounted on the front end of said transfer member and having a slot formed therein for receiving and holding an article, said slot being in alignment with said conveyor when said transfer member is in the first position;
a transfer mechanism having a feed finger initially located out of the path of movement of articles advanced by the conveyor and away from the first position of the transfer member adjacent to the conveyor, said feed finger being mounted for (1) pivotal movement into the path of movement of the articles and (2) reciprocating movement from the conveyor toward the first position of said transfer member;
means for imparting reciprocating and pivotal movement to said feed finger to pivot said feed finger into the path of movement of the articles and to move said feed finger into engagement with an article on the conveyor to move the article into the slot formed in said guide member whereafter said feed finger is returned to its initial position; and
means rendered effective upon movement of said feed finger to its initial position for advancing said transfer member from the first position to the second position within the chamber.

22. In an apparatus for feeding articles into a chamber, as set forth in claim 21:
means located between said feed finger and the movement imparting means and rendered effective upon the feed finger encountering an obstruction for interrupting the movement of said feed finger by disconnecting the movement imparting means from said feed finger.

23. In an apparatus for moving an article into a sealed chamber having a controlled atmosphere maintained therein and onto a conveyor located within the chamber through an entrance opening in the chamber without disturbing the controlled atmosphere in the chamber:
a transfer and lock unit mounted within the entrance opening, said unit including (1) a barrel fitted snugly into the entrance opening and projecting into the chamber, (2) a hollow cover movably mounted within the chamber and having its open end normally engaging the projecting end of said barrel to seal the chamber from the ambient atmosphere, and (3) a transfer member mounted for movement into said barrel and having a front end provided with at least one guide member having a slot formed therein for receiving and holding the article;
means for advancing said transfer member through the open end of said barrel to position said guide member inside said hollow cover and align the slot formed therein with the conveyor;
sealing means mounted on said transfer member and rendered effective upon movement of said transfer member into said barrel for sealing the interior of said barrel from the ambient atmosphere;
means rendered effective upon the sealing of said barrel from the ambient atmosphere for applying the controlled atmosphere to the sealed interior of said barrel;

means operated upon the application of the controlled atmosphere to said barrel for moving said hollow cover out of engagement with said barrel; and a feed mechanism located within the chamber including a feed finger cyclically operable upon movement of said hollow cover out of engagement with said barrel for engaging the article and moving the article along the slot in said guide member to the conveyor.

24. In an apparatus for removing an article from a chamber having a controlled atmosphere maintained therein, through an opening in the chamber while preventing the ambient atmosphere from entering the chamber:

a transfer and lock unit mounted in the opening, said unit including (1) a barrel fitted snugly into the opening and projecting into the chamber, (2) a hollow cover movably mounted within the chamber and having its open end normally engaging the projecting end of said barrel to seal the chamber from the ambient atmosphere, and (3) a transfer member mounted for movement into said barrel and having a front end provided with article holding means;

means for cyclically moving said transfer member into and out of said barrel;

external sealing means mounted on said transfer member and rendered effective upon movement of said transfer member into said barrel for covering the other end of said barrel to seal the interior thereof from the ambient atmosphere;

means rendered effective upon the sealing of said barrel by said external sealing means for applying the controlled atmosphere to the sealed interior of said barrel;

means for moving said hollow cover out of engagement with said barrel to expose the front end of said transfer member to the controlled atmosphere in the chamber;

a feed mechanism located in the chamber and rendered effective upon movement of said hollow cover out of engagement with said barrel for positioning an article on said article holding means of said transfer member;

means rendered effective after the operation of said feed mechanism for returning said hollow cover into engagement with the projecting end of said barrel to reseal the interior thereof from said controlled atmosphere; and means rendered operative prior to movement of said transfer member out of said barrel for allowing ambient atmosphere to enter the interior of said barrel whereafter movement of said transfer member out of said barrel moves the article into the ambient atmosphere.

25. In an apparatus for transferring an article from a conveyor, which is continuously advancing articles at a predetermined speed along a fixed path of movement in a spaced apart relationship through a processing chamber, and for removing the article from the chamber;

a feed finger located at the end of the conveyor and normally located out of the path of movement of the articles, said feed finger mounted for reciprocation between an initial position adjacent the conveyor and an extended position past the end of the conveyor and for pivotal movement into and out of the article path of movement;

a transfer member mounted for movement from a first position within the chamber and adjacent to the conveyor to a second position outside the chamber, said transfer member having article holding means located in registration with the end of the conveyor when said transfer member is in the first position;

means for reciprocating said feed finger between the initial position and the extended position toward said transfer member at a rate of speed which is greater than said predetermined speed;

means rendered effective during movement of said feed finger toward said transfer member and while said feed finger is adjacent to a space between first and second articles on the conveyor for pivoting said feed finger into the path of movement of the articles to move said feed finger into said space whereupon said feed finger engages the first article and moves the first article relative to said conveyor and into said article holding means; and means rendered effective upon the return of said feed finger to the initial position for moving said transfer member from the first position to the second position to remove the article from the chamber.

26. In an apparatus for transferring an article from a conveyor located within a treating chamber and for removing the article from the chamber, as set forth in claim 25:

means rendered effective during return movement of said feed finger to its initial position for pivoting said feed finger out of the path of movement of the articles to prevent said feed finger from interfering with movement of the second article along the conveyor.

27. In a transfer mechanism for removing articles from a chamber and feeding the articles to a conveyor located outside the chamber:

a transfer member mounted for movement between a first position within the chamber and a second position outside the chamber, said transfer member having at least one guide member mounted on its front end provided with a slot for receiving and holding an article, said slot being in alignment with the conveyor when said transfer member is located in its second position;

means for moving said transfer member from the first position within the chamber to the second position outside the chamber to align the article held by said guide member with the conveyor;

a feed finger mounted for reciprocating movement from an initial position adjacent to the conveyor to an extended position beyond the aligned article held by said guide member and for pivotal movement toward and away from the article;

means for reciprocating said feed finger between the initial position and the extended position;

means rendered effective during movement of said feed finger from its initial position to its extended position for pivoting said feed finger away from the article to avoid engaging said article; and means rendered effective upon return movement of said feed finger toward the initial position for pivoting the feed finger toward said article whereupon said feed finger engages and moves the article to the conveyor.

28. In an apparatus for advancing an article through a controlled atmosphere:

a chamber having a controlled atmosphere maintained therein, said chamber having an entrance port;

internal sealing means movably mounted within said chamber and normally covering said entrance port to prevent the ambient atmosphere from affecting said controlled atmosphere, said internal sealing means having an article receiving space formed therein, in registration within said entrance port;

transfer means for advancing an article through said entrance port into said receiving space;

means rendered effective upon advancement of said transfer means into said receiving space for sealing said receiving space from the ambient atmosphere;

means for moving said internal sealing means away from said entrance port to expose the article to said controlled atmosphere in said chamber; and means rendered effective upon movement of said internal sealing means for moving the article from said transfer means through the controlled atmosphere within the chamber.

29. An apparatus for advancing an article through a controlled atmosphere, as set forth in claim 28, including:
means rendered effective upon the sealing of said receiving space and prior to movement of said internal sealing means for supplying said receiving space with said controlled atmosphere.

30. In a device for moving an article into a sealed chamber and onto a conveyor located within the chamber through an opening in a wall forming part of the chamber:
a transfer and lock unit mounted within the opening in the wall of the chamber, said transfer unit including (1) a hollow cover movably mounted within said chamber and having its open end normally covering said opening for sealing said chamber from the outside atmosphere and (2) a movable transfer member located outside said chamber and having a front end provided with means for receiving and holding an article;
a sealing rim projecting from said transfer member spaced from an overlying said opening;
means for advancing said transfer member through said opening and into the open end of said hollow cover to move said article into said chamber and to move said sealing rim to cooperate with the wall of said chamber to seal said opening;
means rendered effective upon complete advancement of said transfer member for moving said hollow cover away from said opening to expose said article to the atmosphere within said chamber; and
means rendered effective upon movement of said hollow cover away from said opening for moving the article from the front end of said transfer member onto the conveyor.

31. In a device for moving an article into a sealed chamber having a partial vacuum maintained therein and onto a conveyor located within the chamber through an entrance opening in the chamber without disturbing the partial vacuum;
a transfer and lock unit mounted within the entrance opening, asid unit including (1) a barrel in sealing engagement with the wall of the chamber about the entrance opening and projecting into the chamber, (2) a hollow cover movably mounted within the chamber and having its open end normally engaging the projecting end of said barrel to seal the chamber from the ambient atmosphere, and (3) a transfer member mounted for movement into said barrel and having a front end provided with article holding means;
a sealing rim projecting from said transfer member spaced from the other open end of said barrel;
means for advancing said transfer member through the open end of said barrel to position its front end inside said hollow cover and to move said sealing rim into engagement with the open end of said barrel to seal the interior thereof from the ambient atmosphere;
means rendered effective upon the sealing of said barrel for applying a partial vacuum to the sealed interior of said barrel;
means rendered effective upon the application of a partial vacuum to said barrel for moving said hollow cover out of engagement with said barrel; and
a feed mechanism located within the chamber and rendered operable upon movement of said hollow cover out of engagement with said barrel for advancing an article from the holding means of said transfer member to the conveyor.

32. In an apparatus for continuously moving articles from an external means to an internal conveyor means within a chamber which is isolated from the ambient atmosphere:
a transfer and lock unit located within an opening in a wall of the chamber of an entrance end thereof, said transfer unit including (1) a hollow cover movably mounted within the chamber and having its open end normally in registration with the opening in the wall for covering the opening and sealing the chamber from the ambient atmosphere and (2) a movable transfer member positioned outside the chamber and having a front end provided with article holding means;
a sealing rim projecting from said transfer member spaced from and overlying said opening;
transfer means for moving an article from said external conveyor means to the front end of said transfer member and onto said article holding means;
means for advancing the front end of said transfer member through said opening and into said hollow cover to move the article into the chamber and to move said sealing rim into contact with the side wall of the chamber to seal said opening and the interior of said hollow cover from the ambient atmosphere;
means rendered effective upon complete advancement of said transfer member for moving said hollow cover away from said opening to expose the article to the atmosphere within the chamber; and
a feed mechanism rendered effective upon movement of said hollow cover away from said opening for moving the article from the front end of said transfer member to the internal conveyor means.

References Cited
UNITED STATES PATENTS

| | | | |
|---|---|---|---|
| 3,294,670 | 12/1966 | Charschan et al. | 214—17 XR |
| 3,340,176 | 9/1967 | Belluso et al. | 214—17 XR |
| 3,404,661 | 10/1968 | Mathias et al. | 118—49 |

ROBERT G. SHERIDAN, Primary Examiner

U.S. Cl. X.R.

34—242; 118—49; 198—24; 214—21, 23